United States Patent [19]
Propst

[11] Patent Number: 4,464,689
[45] Date of Patent: Aug. 7, 1984

[54] RANDOM ACCESS READ/WRITE UNIT

[75] Inventor: Franklin M. Propst, Urbana, Ill.

[73] Assignee: Education & Informations Systems, Inc., Champaign, Ill.

[21] Appl. No.: 270,419

[22] Filed: Jun. 4, 1981

[51] Int. Cl.³ .................. G11B 21/08; G11B 15/48
[52] U.S. Cl. ................................. 360/78; 360/72.1; 360/74.1
[58] Field of Search ............................ 360/77–78, 360/75, 70, 72.1, 72.2, 74.1; 369/30, 32, 34, 44, 45, 111; 358/34, 907; 365/234

[56] References Cited

U.S. PATENT DOCUMENTS

| | | | |
|---|---|---|---|
| 4,066,349 | 1/1978 | Flint | 360/72.1 |
| 4,103,314 | 7/1978 | Case | 360/78 |
| 4,124,872 | 11/1978 | Probst | 360/78 X |
| 4,135,217 | 1/1979 | Jacques et al. | 360/77 |
| 4,352,131 | 9/1982 | Van Herk | 360/78 |

Primary Examiner—John H. Wolff
Attorney, Agent, or Firm—Wood, Dalton, Phillips, Mason & Rowe

[57] ABSTRACT

A random access read/write unit includes radial and angular positioning systems for accessing one of a plurality of storage locations or positions arranged in a two dimensional coordinate system on a storage medium such as a magnetic disc. The radial positioning system includes coarse and fine positioning devices for accurately locating a read/write mechanism or "head" at one of a plurality of concentric tracks located on the magnetic disc. The coarse positioning device includes a plurality of sensors which provide information denoting the position of the read/write head relative to the desired track. The fine positioning device is engaged once the coarse positioning device has located the head at approximately the desired track, and includes means for finally positioning the head accurately with respect to the desired track. An angular positioning system rotates the disc relative to the head, so that the head accesses any one of a plurality of angular sectors disposed about the disc. The random access unit provides a high degree of reliability even after repeated usage, is relatively inexpensive to manufacture, records and plays digital information and/or high quality audio recordings and is quiet in operation.

32 Claims, 27 Drawing Figures

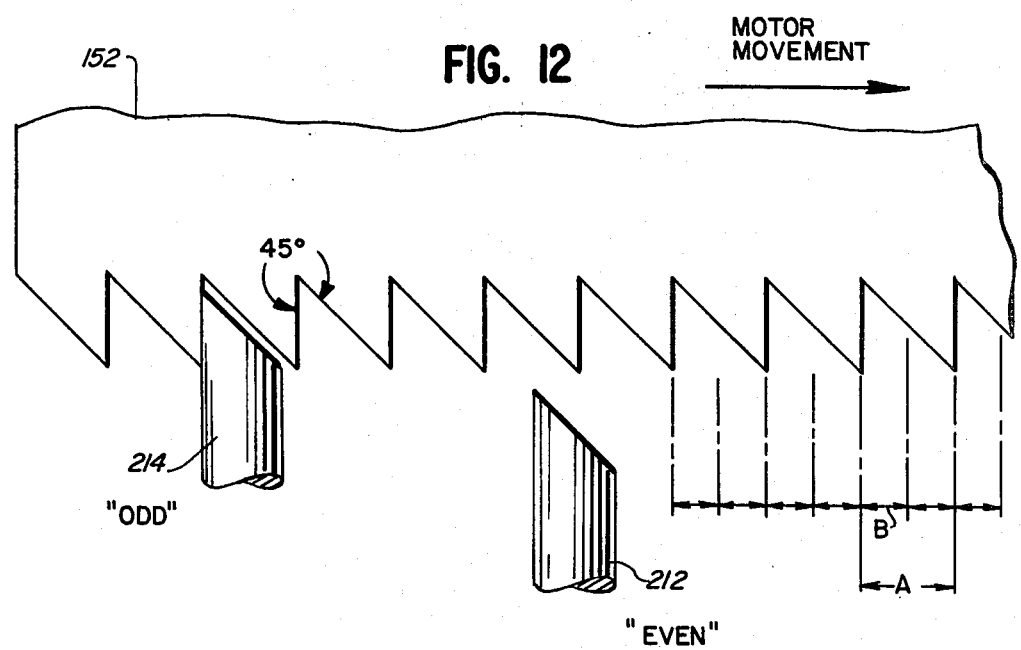
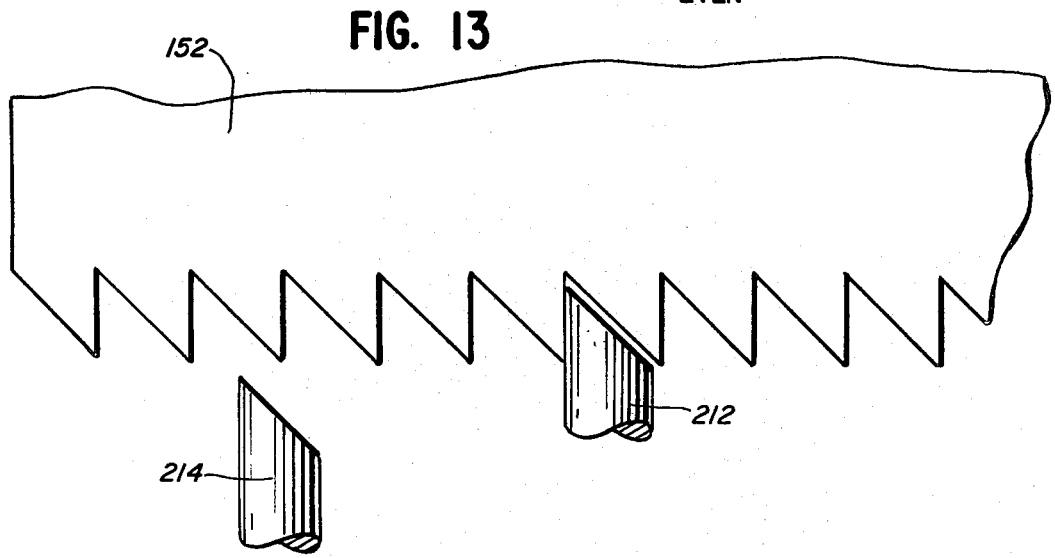
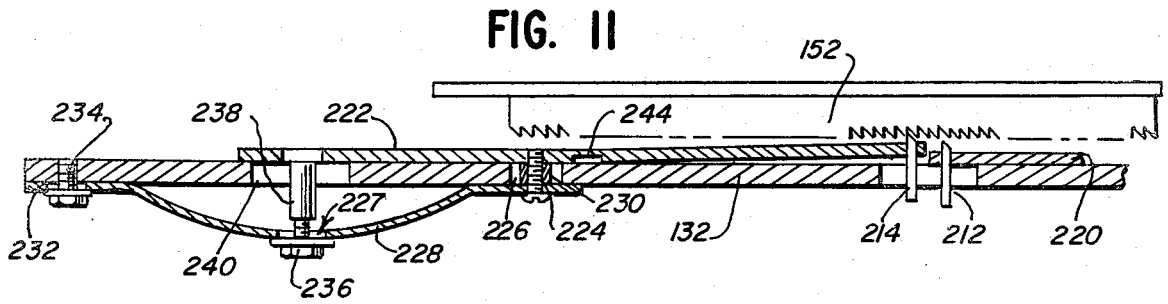

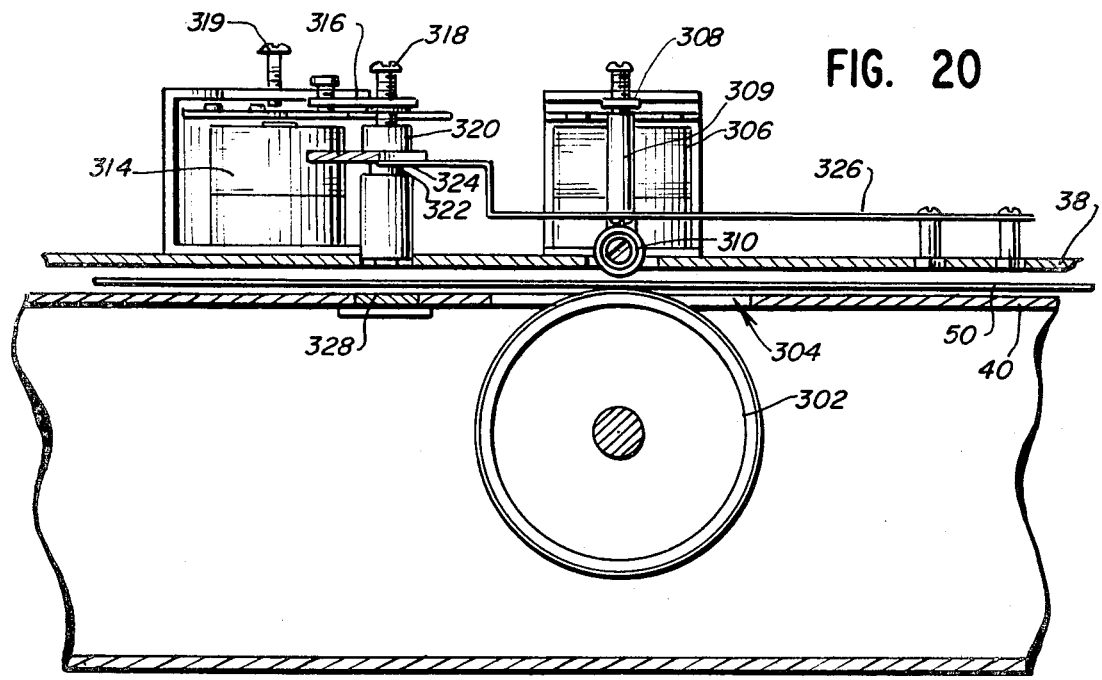
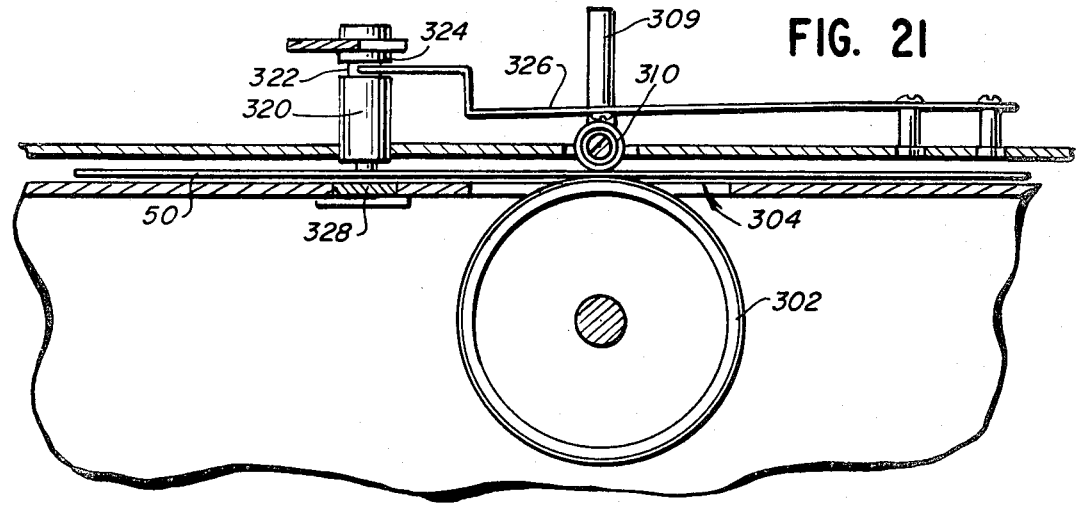
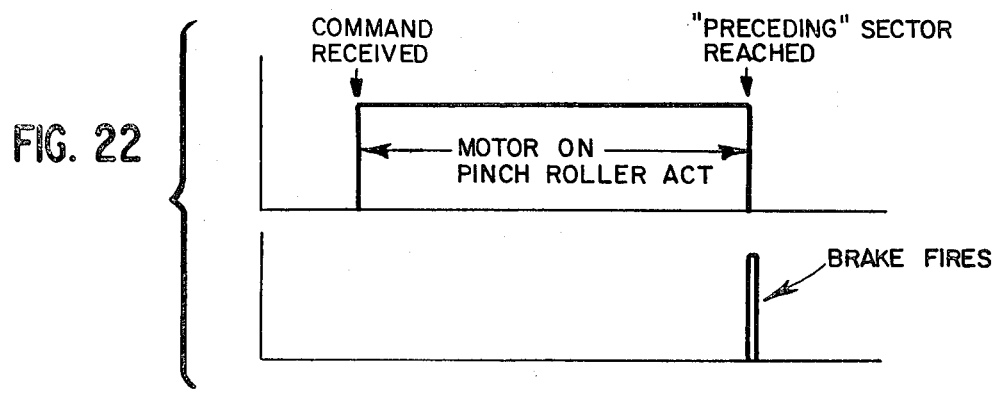

"STARTING SECTOR"
"HEAD LINE"
"ENDING SECTOR"

"STARTING SECTOR"
"HEAD LINE"
"ENDING SECTOR"

RANDOM ACCESS READ/WRITE UNIT

BACKGROUND OF THE INVENTION

This invention relates generally to random access storage and retrieval systems, and more particularly to a system for rapidly and accurately accessing a selected storage location or position contained within a two dimensional array located in a storage medium.

Prior random access retrieval and storage systems are of several forms, among which is the type which utilizes a grooveless magnetic disc having a plurality of concentric discrete tracks divided into a plurality of angular sectors. Data is stored in or retrieved from one or more of the sectors by means of a read/write head mounted on a carriage which is capable of positioning the head at any one of the plurality of tracks.

The disc is rotated at a high speed and the head is simultaneously advanced linearly until the desired sector and track are located adjacent the read/write head, at which point a read/write motor drives the disc at a second speed to allow recording or playback of information at the desired sector or series of consecutive sectors.

Prior random access systems of this type have utilized pneumatic components and mechanical linkages which require an external source of pressurized air. Surge forces, which can produce strong impact forces on coupling members and other components in the system, may be encountered when using pressurized air sources. These strong impact forces can lead to undesirable wear, and can decrease positioning accuracy of the head relative to the disc over the life of the random access system.

Moreover, in random access systems of this type it is difficult to initially calibrate the system so that accurate storage position accessing results, and calibration is difficult to maintain so that the accuracy of this type of prior access system is decreased over the life of the system.

Furthermore, pneumatic drive systems are inconvenient due to the necessity of an external source of pressurized air, and are expensive, noisy and sometimes unreliable.

Also, prior random access units of the type described above suffer from the disadvantage that they are not capable of smoothly linking adjacent tracks in a continuous message. For example, if a message length occupies more than the number of sectors disposed about the disc, such that the head must move from a first track to the next adjacent inner track in order to record or play back an entire message, noticeable disturbances are encountered at the track crossings due to the inability of this type of system to repeatedly follow the same path at these crossings.

A random access system of this type typically utilizes a plurality of serially coupled cylinders for radially positioning the head. Due to mechanical limitations, this type of radial positioning system allows typically a maximum of only four adjacent tracks to be coupled together, thereby limiting the effective length of any message desired to be stored on or retrieved from a disc.

SUMMARY OF THE INVENTION

The present invention overcomes the above noted difficulties by utilizing radial and angular positioning systems which are inherently extremely reliable, inexpensive, quiet and relatively simple to calibrate.

The accessing system of the present invention includes a radial positioning system which comprises a carriage slidably mounted between a pair of rails with the read/write head disposed on one end of the carriage. The radial positioning system includes "coarse" and "fine" positioning apparatus which quickly and reliably locate the head at a desired track.

The coarse positioning apparatus includes a plurality of light emitting diode (LED)-phototransistor pairs which "read" an encoded photographic film which contains radial positioning information. The outputs of the LED-phototransistor pairs are interpreted by control logic which in turn controls a drive motor for the carriage and a brake for stopping the carriage such that the head is located within a "capture range" which surrounds and includes the desired track position.

The control logic accounts for the inertia of the carriage as it is moved by the motor, and hence repeatability and accuracy are maximized.

The fine positioning apparatus includes a pair of pawl which engage a toothed rack rigidly attached to the carriage. The pawls are readily adjustable to allow accurate final positioning of the head relative to the axis of rotation of the disc, so as to be capable of establishing and repeatedly accessing the read/write track locations on the disc.

The angular positioning system includes a fast access motor which rapidly rotates the disc to the sector preceding the desired sector. A brake loading system is utilized which quickly brakes the disc to a stop within one-half of a sector preceding the start of the desired sector, thereby allowing subsequent engagement of a read/write drive motor to rotate the disc at the required read/write speed.

The brake loading system allows the desired sector to be accessed faster and more reliably than is possible when using prior systems.

The system of the present invention allows the head to cross smoothly from one track to an adjacent inner track during record or playback without producing noticeable signal disturbances during the crossing. Moreover, the number of tracks which can be smoothly linked together are not limited thereby allowing recording and playback of message lengths up to the available storage space on the disc, that is, until the innermost track is reached.

The random access unit of the present invention utilizes a relatively inexpensive DC motor and optoelectronic sensors to position the head at a desired storage position. The system is quiet in operation, relatively inexpensive and very accurate, even under repeated use.

Other aspects, objects and advantages of the invention will be apparent to those skilled in the art from the following detailed description, taken in conjunction with the drawings and the appended claims.

BRIEF DESCRIPTION OF THE DRAWINGS

FIG. 11 is a sectional view of the fine positioning system taken along line 11—11 of FIG. 7;

FIGS. 12 and 13 are enlarged fragmentary views showing the engagement of the fine positioning system of FIG. 11;

FIGS. 20 and 21 are elevational views, partly in section, of the angular access drive and brake system of the invention;

FIG. 22 is a timing diagram illustrating the operation of the fast access system.

DESCRIPTION OF THE PREFERRED EMBODIMENT

General Unit Structure

Figure 1:
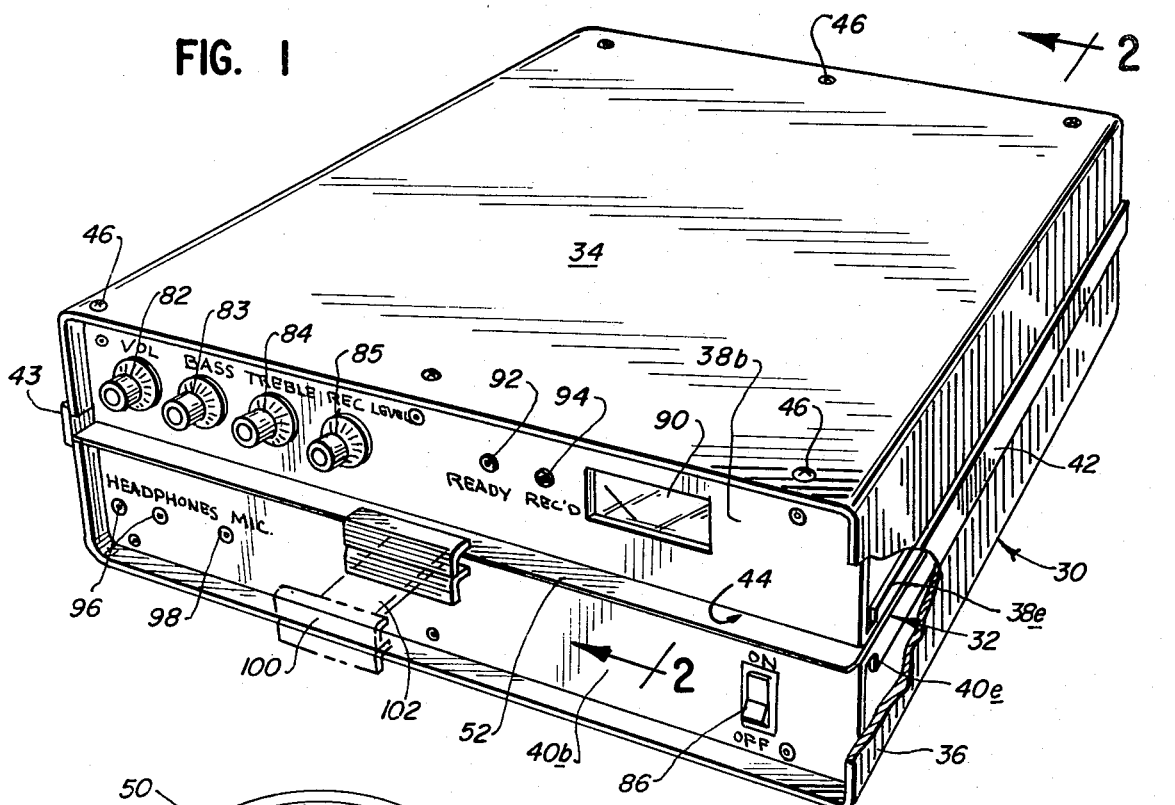
FIG. 1 is a perspective view of the random access unit of the present invention.
Figure 2:
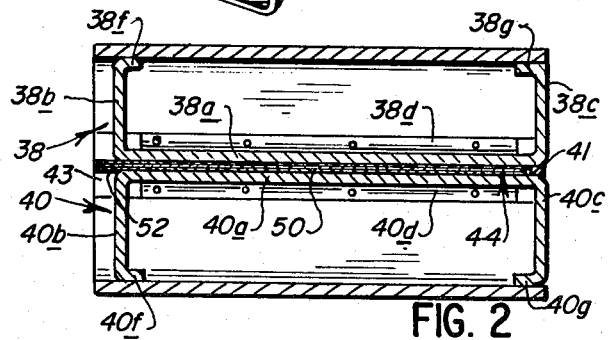
FIG. 2 is a sectional view taken along line 2—2 of FIG. 1.

Referring to FIGS. 1 and 2, a random access unit 30 according to the present invention is shown. The unit 30 includes a chassis 32 enclosed on its top and bottom by upper and lower covers 34 and 36, respectively, which are secured to the chassis 32 by means of screws or by other suitable fastening means, as described below.

The chassis 32 includes upper and lower U-shaped chassis members 38,40, each having a flat base 38a,40a, respectively, as best seen in FIG. 2. Each of the bases 38a,40a extends between a pair of legs 38b,38c and 40b, 40c, respectively, which form the front and back faces of the unit 30.

The bases 38a,40a are rigidly joined to and spaced from one another by a pair of metal channels 42, 43. The upper and lower chassis members 38,40 each include a pair of flanges 38d,38e and 40d,40e, respectively, to which the metal channels 42,43 are secured.

A metal bar 41, FIG. 2, is located between the bases 38a,40a at the rear of the unit 30 to enclose the back of the space between the upper and lower chassis members 38,40.

The upper and lower covers 34,36 are inserted into the metal channels 42,43 and are secured to the upper and lower chassis members by means of screws 46 which extend into inturned flanges 38f,38g and 40f,40g, integral with the upper and lower chassis members 38,40, respectively.

The spacing between the bases of the upper and lower chassis members 38,40 is sufficient to permit sliding insertion and removal of a magnetic disc 50 which is contained within an envelope 52. The envelope 52 protects and provides mechanical support for the disc 50. The disc 50 may typically have a thickness of three mils and have a diameter of 15 inches. The disc 50 is of the grooveless type similar to that typically used in data processing applications.

Figure 3A:
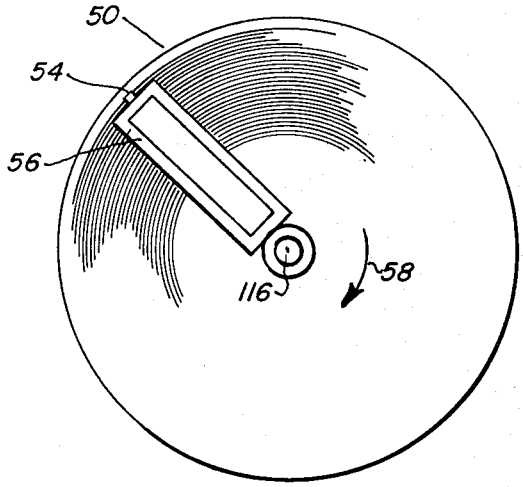
FIGS. 3a and 3b are schematic plan views of the magnetic disc, read/write head and carriage utilized in the invention with the carriage in different radial positions and with the disc inserted in the envelope in FIG. 3b.
Figure 3B:
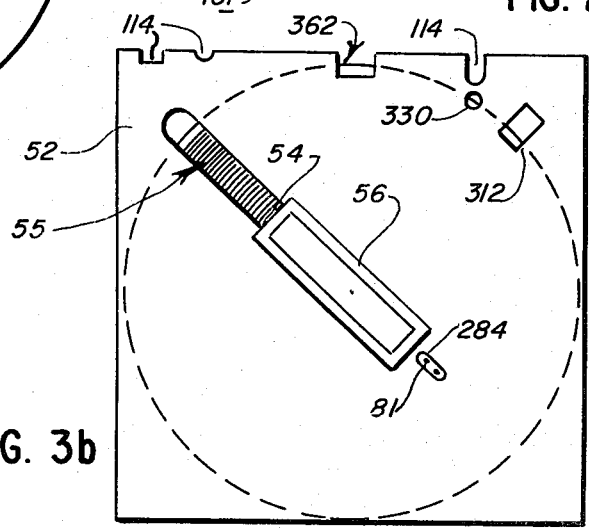

Referring now to FIGS. 3a and 3b, information is generally stored on or retrieved from the magnetic disc 50 by means of a magnetic read/write head 54 which is mounted on a carriage 56 within the unit 30 and which contacts the disc through a cut out portion 55 in the faces of the envelope 52. The carriage 56 is slidably mounted so as to allow the head to access one of a plurality of concentric tracks located on the disc 50. A typical disc may have 128 such tracks arranged concentrically about the disc. When the head 54 is located in the position shown in FIG. 3a, the "zero" or outermost track is accessed by the head 54, and when the head is in the position shown in FIG. 3b, the innermost track, or track 127 in the illustrated embodiment is accessed by the head 54.

Each of the 128 tracks is divided into a plurality of sectors, each of which occupy equal angular distances around the disc. Typically, each track comprises 32 sectors. The disc 50 may be rotated in the direction of the arrow 58 in FIG. 3a such that each of the 32 sectors pass the line of travel of the head 54. Consequently, in the illustrated embodiment, the head 54 is capable of accessing any one of the 128×32 or 4096 separate storage positions.

It should be noted that the number of tracks and sectors into which the disc is divided may be varied. Moreover, the head positioning operation described above may be used to access any type of storage medium having a plurality of storage positions arranged in a two dimensional array.

General Unit Operation

Figure 4:
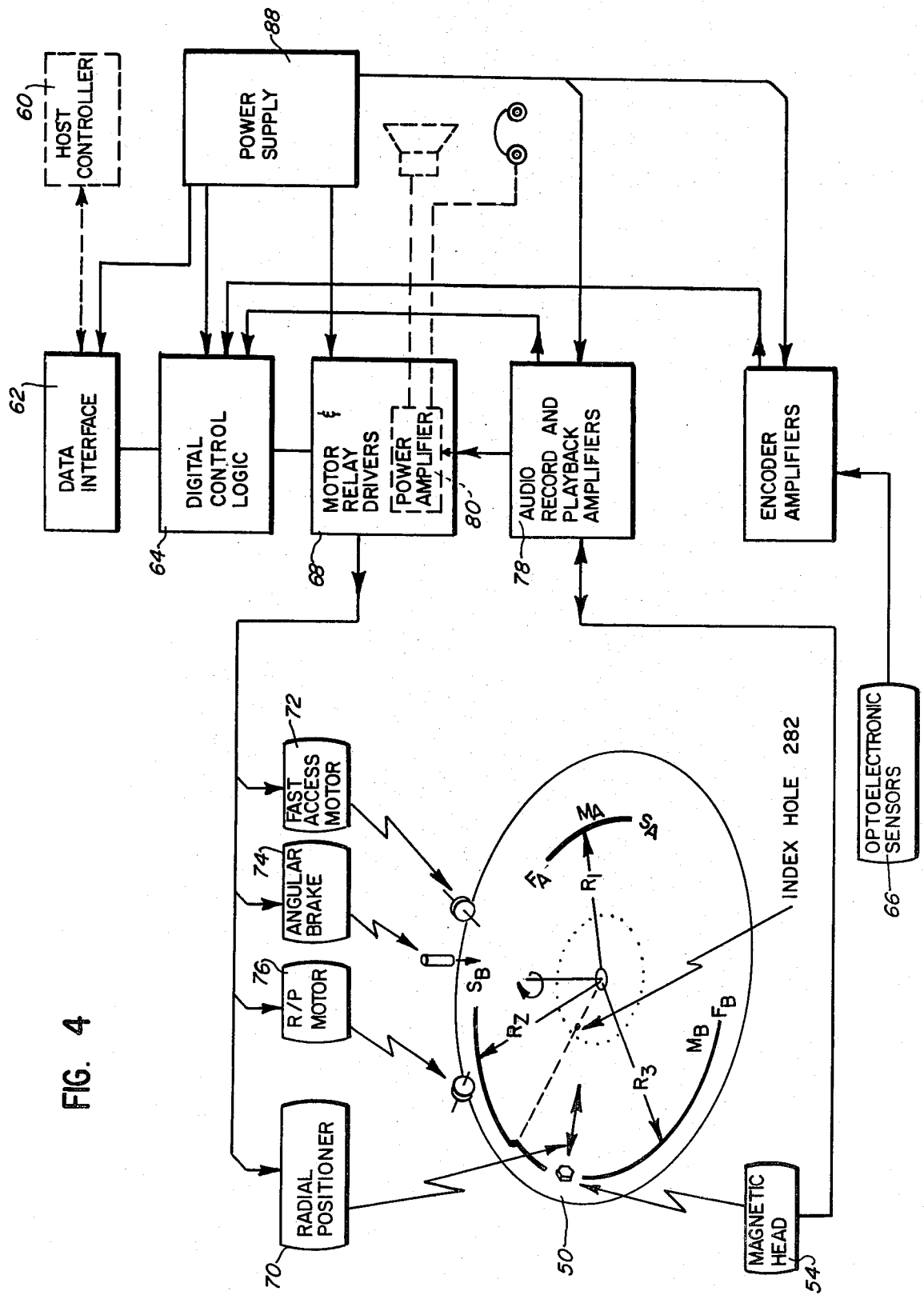
FIG. 4 is a block diagram of the accessing system of the invention.

Referring now to FIG. 4, a block diagram of the random access unit 30 is illustrated in conjunction with the magnetic disc 50.

The random access unit 30 acts in response to a command by a host controller 60, which provides a plurality of data bits which identify the storage position which is desired to be accessed, i.e. the starting track, starting sector, and length of the message.

The information from the host controller 60 is coupled to a data interface 62 which converts the information into a form usable by the unit 30. The converted information is then provided to a digital control logic circuit, indicated generally at 64, which in turn instructs other circuits to position the magnetic head 54 and the disc 50 so as to access the desired storage position.

The control logic 64 receives signals from a series of opto-electronic sensors 66 which includes radial position sensors and angular position sensors (both to be described in detail hereinafter). The radial position sensors sense the position of the carriage, and hence the current radial position of the magnetic head 54. The digital control 64 compares the current and desired radial head positions to determine the required radial movement of the magnetic head 54. A motor and relay driver circuit 68 then instructs a "coarse" positioning device (described in detail below) of a radial positioner 70 to position the head 54 at the approximate desired location, i.e. within a particular distance, called a "capture range", of the desired track.

Once the sensors 66 indicate that the head 54 is approximately at the desired location, a "fine" positioning device (described in detail below) of the radial positioner 70 is actuated to accurately position and maintain the head 54 at the desired track.

The motor and relay driver circuit 68 also controls a fast access motor 72 which rotates the disc 50 beneath the line of travel of the head 54 so that the desired sector is located adjacent the head 54 ready for immediate recording or playback.

The fast access motor 72 operates at high speed to quickly rotate the disc 50 to the desired sector. The sector positions relative to the head 54 are sensed by the angular position sensors which in turn couple a signal back to the control logic 64 to terminate high speed rotation of the disc 50 when the sector preceding the desired sector is reached.

When the sector preceding the desired sector has been accessed, the motor and relay driver circuit 68 receives a signal from the control logic 64 to actuate an angular brake 74, which rapidly stops the rotation of the disc 50. At this time, the driver circuit 68 then actuates a read/write motor 76 which rotates the disc 50 at an accurately controlled speed to permit recording or playback of information. Also at this time, a head backing plate (described in detail hereinafter) is moved upwardly into contact with the underside of the disc 50 opposite the head 54 to insure proper contact or the head 54 and disc 50.

During playback, the head 54 senses the information on the disc 50 and feeds it to an amplifier 78 and a power amplifier 80 so as to drive a speaker, headphones, and/or other device for delivering the information to a user.

Conversely, when the unit 30 is in the record mode, the magnetic head 54 receives information in either digital or analog form from the amplifier 78 and stores this information at the desired storage position.

The random access unit is capable of storing and retrieving messages or information of varying length, from a fraction of a sector duration up to the entire set of 4096 storage positions. For example, as illustrated in FIG. 4, a first message $M_A$ might be stored on a track having a radius $R_1$ and beginning at the point labelled $S_A$ and ending at the point labelled $F_A$.

Alternatively, a message $M_B$ which requires more than the remaining sectors in a particular track may begin on a first track having radius $R_2$ and continue on the next adjoining inner track having a radius $R_3$. The control logic 64 causes the magnetic head 54 to move radially inward to the next adjoining track at a time related to the sensing by the sensors 66 of an index hole 81 located near the center of the disc 50. The transition of the head 54 from one track to the next adjoining inner track, illustrated in FIG. 4, may be made almost instantaneously or, if desired, may be made so slowly as to occupy the length of an entire sector.

The sequential transition to adjoining inner tracks each time the index hole 81 is sensed allows the recording or playback of messages of relatively long duration. If the radial speed of the head 54 relative to the angular velocity of the disc 50 at the transition between adjacent tracks is high, it is difficult to perceive by ear any interruption in the flow of information. A controlled and slow transition allows uninterrupted reading of digital data during the transition.

Referring again to FIG. 1, the amplifier 78 includes potentiometers 82,83,84,85 which are manually adjustable from the exterior of the unit 30 to selectively control the volume, bass, treble and record level of the information. An ON/OFF switch 86 located on the front of the unit 30 controls a power supply 88, FIG. 4, which provides proper operating voltage for the various components of the unit 30. A record level meter 99 indicates the strength of the signal being recorded on the disc 50 and a pair of indicator lights 92,94 indicate the ready and record/play status, respectively, of the device.

A pair of outputs 96 allow headphone connection to the unit 30. A microphone input 98 allows recording from an externally connected microphone.

Inserting the Disc into the Unit

Referring to FIGS. 1, 3b, 5 and 6, a handle 100 is located on the front of the unit 30. As seen more particularly in FIG. 6, the handle 100 is disposed on the end of an inwardly extending arm 102 which is slidably engaged within a channel 104. A spindle actuator 103 is secured to the arm 102 and extends inwardly toward a plate 106 which is connected to an anchor plate 107 by a hinge spring 108. An angled plate 109 having an angled lip 109a is secured to one side of the hinged plate 106, and a stationary spindle 110 is fixed on the other side of the plate 106, which is shown in phantom in FIGS. 5 and 6.

When the handle 100 is pulled out of the unit 30, the actuator 103 is spaced away from the angled lip 109a, allowing the plate 106 to swing downwardly about the hinge 108, in turn causing the spindle 110 to move downwardly through a recess 112 in the lower chassis member 40.

The envelope 52 containing the disc 40 is then inserted into a slot 44 defined by the spacing between the upper and lower chassis members 38,40, such that a series of cutouts 114 in the envelope 52, shown in FIG. 3b, are positioned at the back of the slot 44.

Once the envelope 52 has been fully inserted into the slot 44, the handle 100 is pushed into the unit 30 its full extent, thereby causing the spindle actuator 103 to contact the lip 109a, in turn causing the plate 106 to hinge upwardly. The upward movement of the plate 106 in turn causes the spindle 110 to move upwardly through the recess 112 and through a hole 116, FIG. 3a, located in the center of the magnetic disc 50. Continued insertion of the handle 100 results in actuator 103 riding over the end of the angled lip 109a a short distance. This "over center" action of the spindle actuator 103 acting against the angled lip 109a allows the actuator 103 to maintain the handle 100 in the closed position and the spindle 110 tightly and accurately fixed, to repeatedly accurately locate the center of rotation of the disc 50.

The disc 40, and hence the envelope 52, are captured within the slot 44 by means of the spindle 110, which serves to center the disc 50 and to maintain the center of the disc stationary relative to the magnetic head 54.

The actuating arm 102 is also provided with a flange 118 which is adapted to contact a spring loaded actuating arm of a switch 120. The switch 120 is connected so as to signal the electrical circuitry of the unit 30 that the handle 100 is fully inserted and that the spindle 110 is locked into position.

Radial Positioning System

Radially Movable Carriage

Referring now to FIGS. 5-9, the novel radial positioner 70 of FIG. 4 is illustrated.

Referring specifically to FIGS. 5 and 7-10, the read/write head 54 is fixed to the end of the carriage 56 which is moved by a drive roller 128 of a motor 130.

The head 54 is secured by mounting means, such as a bar clamp 154, a channel 156 and screws 157 to a front face 158 of the carriage 56. A toothed rack 152 is secured to one side of the carriage 56.

Figure 10:
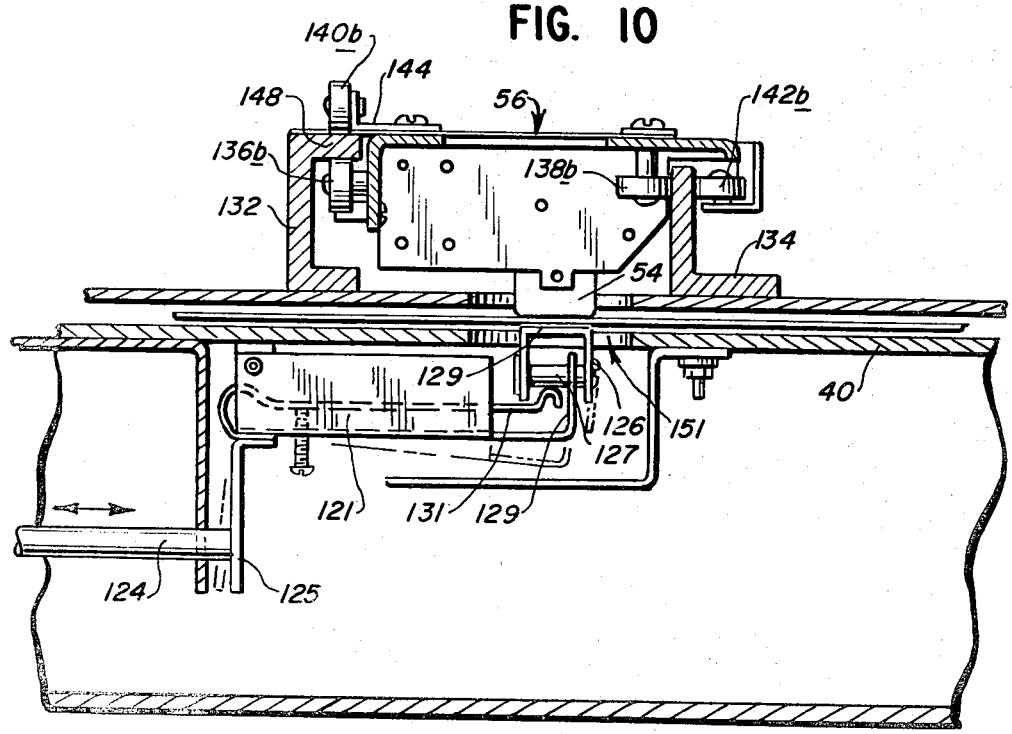
FIG. 10 is a sectional view taken along line 10—10 of FIG. 7.

As best seen in FIG. 10, the carriage 56 is slidably mounted between guide rails, such as a C-shaped rail 132 and an L-shaped rail 134. Each of the rails is secured to the upper chassis member 38 by suitable means, such as by screws or the like.

Figure 8:
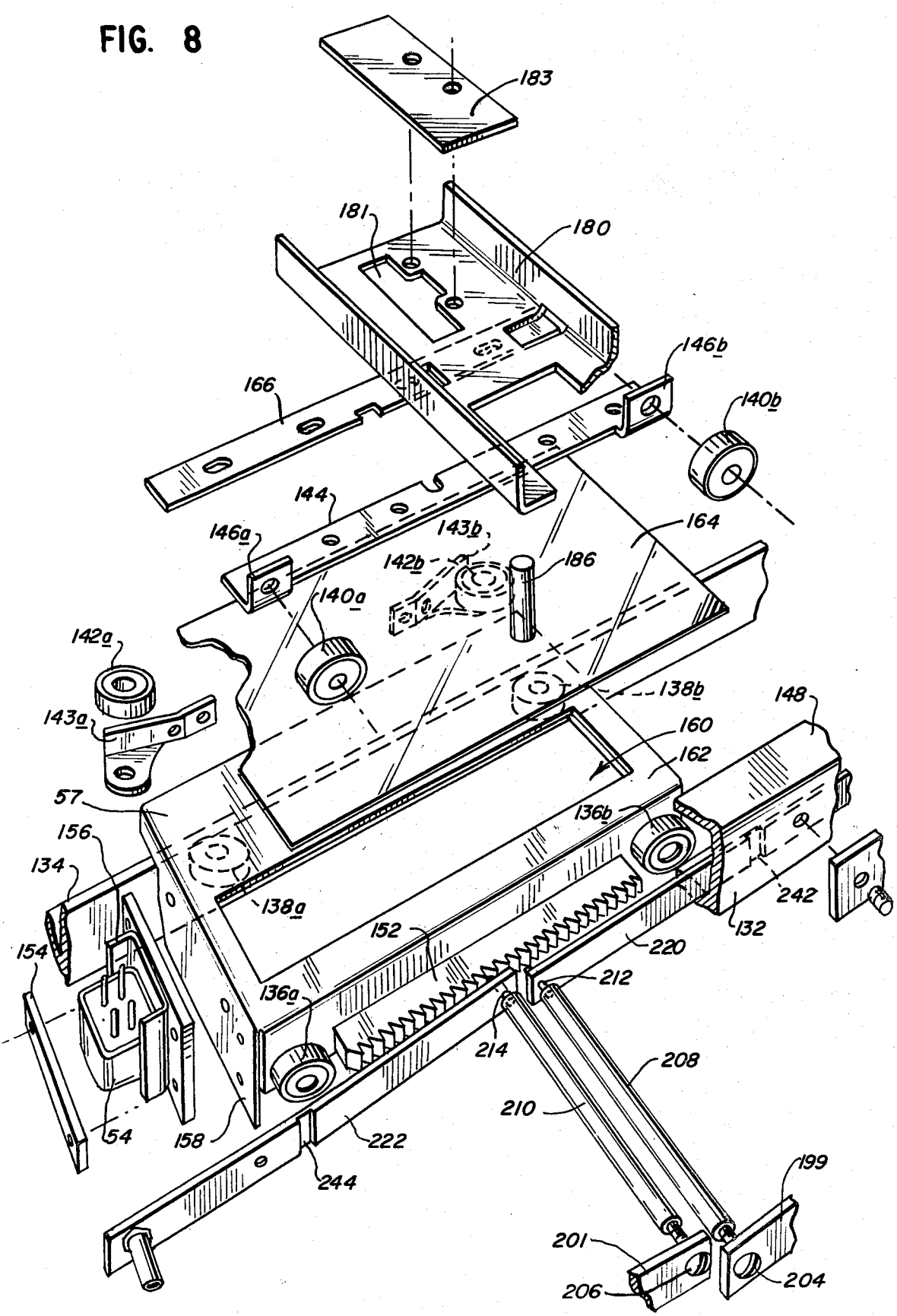
FIG. 8 is an exploded enlarged view of a portion of the head positioning system of FIG. 7.

As best seen in FIG. 8, the carriage 56 includes two pairs of stationary rollers 136a,136b and 138a,138b mounted on each side thereof.

The rollers 136a,136b are mounted at opposite ends of the carriage 56 such that the axes of the rollers are disposed in a horizontal direction. The rollers 138a,138b are mounted on the underside of a top surface 57 of the carriage 56 with their axes disposed in a generally vertical direction.

Two pairs of spring loaded rollers 140a,140b and 142a,142b are secured to the carriage 56 opposite the rollers 136a,136b and 138a,138b, respectively. The rollers 140a,140b are mounted on opposite ends of a spring plate 144 which has upstanding flanges 146a,146b which are adapted to receive the axles of the rollers 140a,140b. The mounting plate 144 is securely fastened to an upper face of the top surface 57 by means of screws or the like such that the rollers 140a,140b are disposed opposite the rollers 136a,136b, thereby capturing an upper flange 148 of the C-shaped rail 132. The positions of the axes of the rollers 140a,140b are selected so that pressure is exerted by the spring plate 144 and these rollers to force the stationary rollers 136a,136b upwardly into contact with the lower surface of the upper flange 148.

The spring loaded rollers 142a,142b are secured to the opposite side of the carriage 56 by means of spring clips 143a,143b, such that the rollers 142a,142b bear against an outside surface of the L-shaped rail 134 directly opposite the stationary rollers 138a,138b. The spring loaded rollers 142a,142b cause the upstanding portion of the L-shaped rail 134 to be captured between the rollers 138a,142a and 138b,142b, and hence provide lateral stability for the carriage 56.

Figure 7:
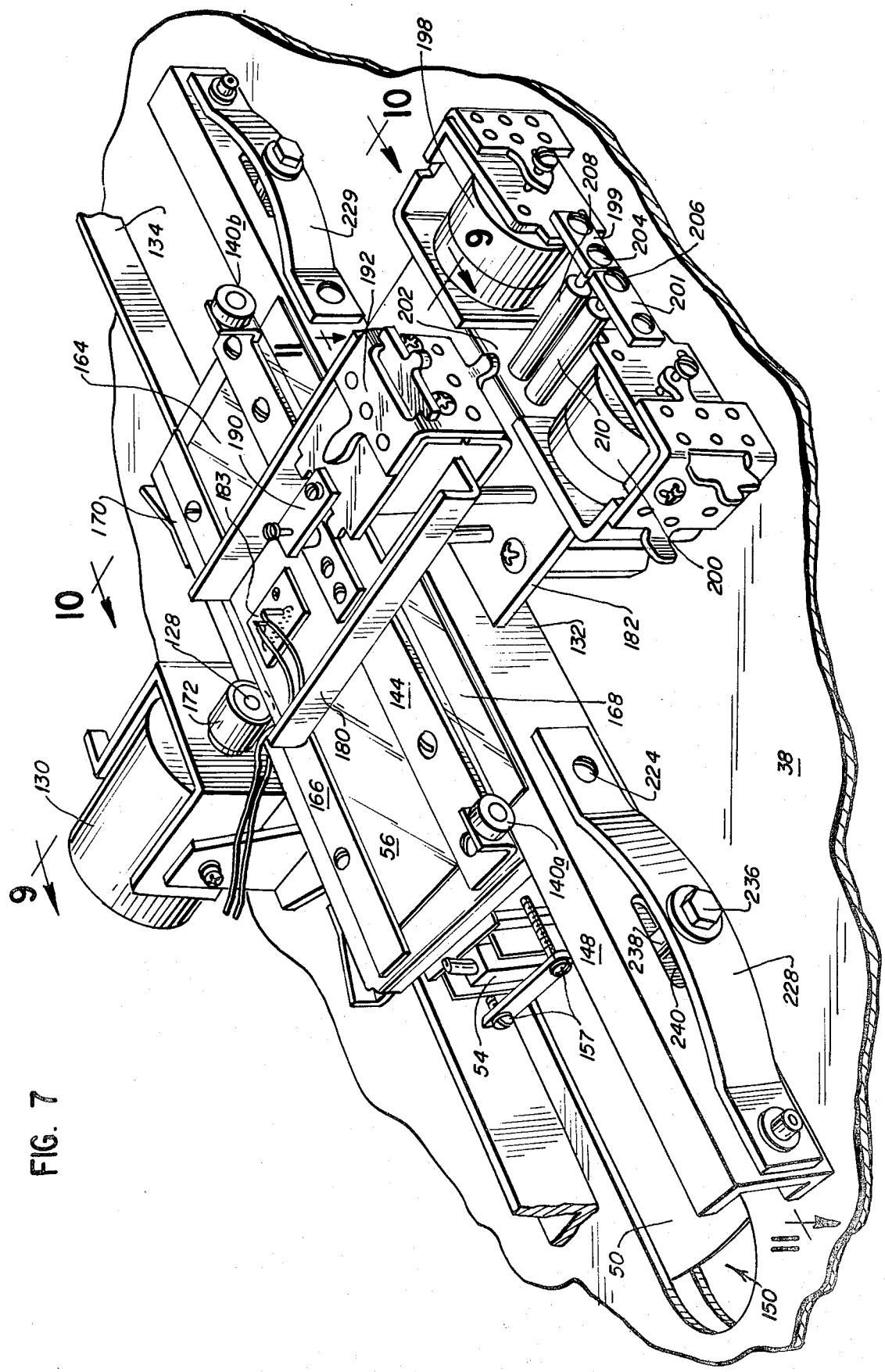
FIG. 7 is an enlarged perspective view of the radial head positioning system.

The carriage is therefore free to move between the guide rails 132,134 in a straight path over an aperture 150, FIG. 7, through which the head 54 projects to contact the disc 50 through the cut out 55.

Fastened over a hole 160 in the top surface 162 of the carriage 56 is a sheet of photographic film 164 which carries encoded information in the form of a series of transparent bars on an opaque background. The sheet 164 is secured to the top surface 162 by the mounting plate 144 and by another mounting plate 166 located on the other side of the hole 160.

A brake leaf 168, FIG. 7, is secured beneath the mounting plate 144 and extends substantially the entire distance between the rollers 140a,140b and overlies substantially the entire width of the top surface of the upper flange 148. The brake leaf 168 is spaced slightly above the upper flange 148 so as to cause as little drag as possible as it moves with the carriage 56 along the rails 132,134. In a preferred embodiment, the brake leaf 168 comprises a strip of polyester film, having a thickness on the order of 0.010 inch. A preferred film material is Mylar, (a trademark of E. I. duPont de Nemours & Co., Inc.).

Figure 5:
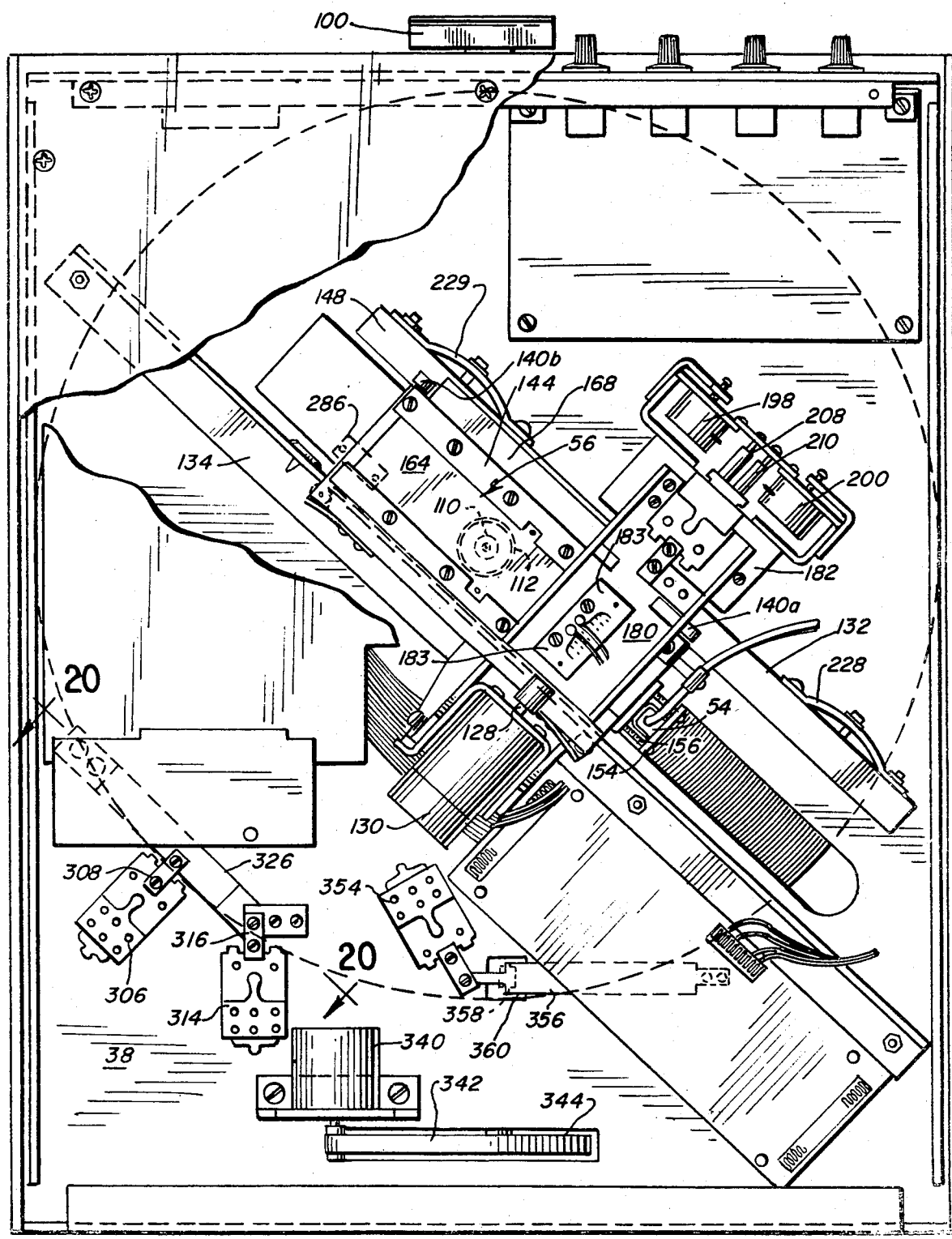
FIG. 5 is an overhead plan view of the random access unit of FIG. 1 with the top cover removed and portions of the electrical circuitry board broken away.

The drive roller 128 of the motor 130, FIGS. 5 and 7, rests on and is in frictional engagement with a side portion 170 of the carriage 56. The drive roller 128 may have a rubber or plastic collar 172 located about the periphery thereof to increase the frictional contact with the side portion 170. It should be noted that a gear and rack combination can be used in place of the frictional engagement described. Also, other means for coupling the motor to the carriage will be obvious to one skilled in the art.

The motor 130 moves carriage 56 between the rails 132 and 134 to position the head 54 to access any one of the tracks located on the disc 50. The operation of the motor 130 is controlled in a manner described in detail below.

Coarse Positioning Apparatus

Referring now to FIGS. 7-10, a mounting bracket 180 is mounted on a guide bracket 182, which is in turn secured to the upper chassis member 38.

The mounting bracket 180 extends toward the motor 130 so as to overhang the space between the guide rails 132,134. Mounted over an aperture 181, FIG. 8, within the channel 180 approximately midway between the rails 132,134 is a card 183 with a set of nine light emitting diodes (LED's) 184a-184i. The LED's 184 are arranged in a straight-line path so as to span the width of the hole 160.

Figure 9:
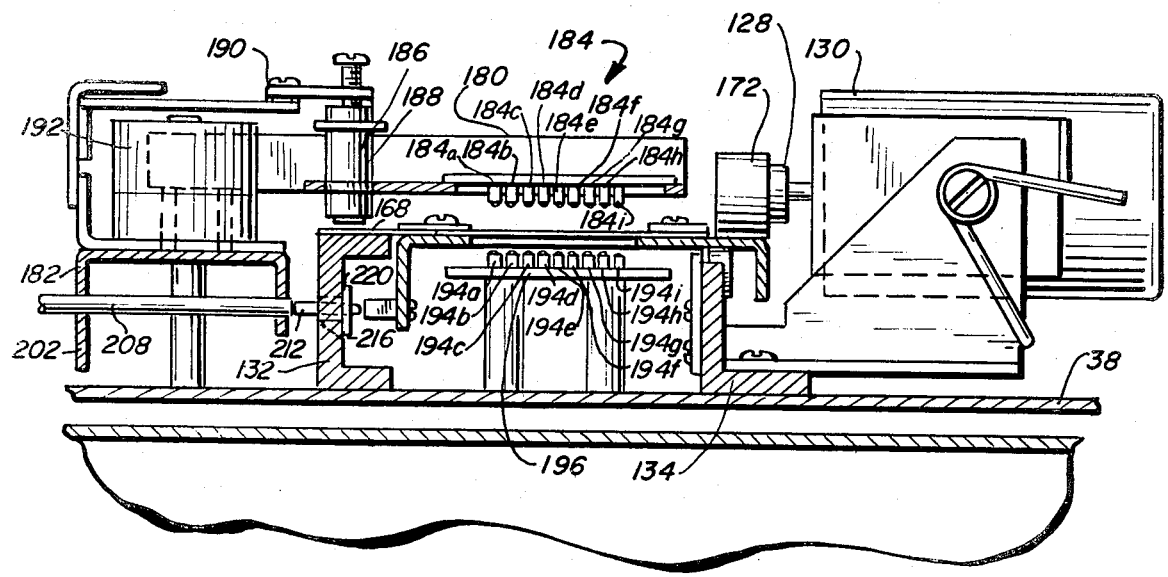
FIG. 9 is a sectional view taken along line 9—9 of FIG. 7.

Also mounted in the bracket 180 is a brake pin 186, FIGS. 8 and 9, which is slidably engaged in a hole 188 located directly above the brake leaf 168. The brake pin 186 is controlled by an actuating arm 190 of a solenoid 192.

Mounted directly beneath the LED's 184a-184i is a set of phototransistors 194a-194i. The phototransistors 194 are mounted on a pedestal 196 which is secured to the upper chassis member 38 such that LED-phototransistor pairs, which are a part of the opto-electronic sensors 66 shown in FIG. 4, are formed by the alignment of similarly lettered LED's and phototransistors. For example, the LED 184a forms a pair with the phototransistor 194a, the LED 184b forms a pair with the phototransistor 194b, and so on.

In the preferred embodiment, the LED-phototransistor pairs are spaced 0.10 inches apart, and the LED's 184 are located approximately 0.050 inch from the phototransistors 194.

Figure 16:
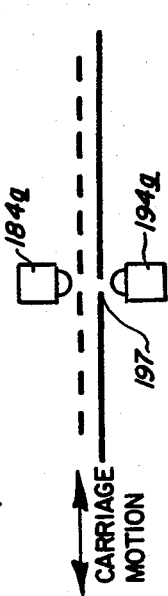
FIG. 16 is an elevational view of a portion of the apparatus for reading the encoded film of FIG. 14.

Referring briefly to FIG. 16, a mask 197 comprising a piece of photographic film (not shown in FIGS. 7-10 for purposes of clarity) is located directly above the phototransistors 194. The mask 197 includes a transparent slot 197a extending over and directly above the array of phototransistors 194. The mask 197 may be epoxied to a metal plate (not shown) which is in turn secured to the pedestal 196.

Figure 14:
FIG. 14 is a plan view of the encoded film utilized with the coarse positioning system of the invention.
Figure 15:
FIG. 15 is an enlarged fragmentary view of a portion of the film of FIG. 14.

Referring now to FIGS. 14–16, the film sheet 164, upon which is located the encoded information representing the position of the read/write head 54 relative to the tracks on the disc 50, is shown in enlarged detail.

The information is "read" by the LED-phototransistor pairs 184 and 194 as the film 164 carried by the carriage 56 passes between these pairs.

The sheet of film 164 contains transparent bars arranged in nine rows on an opaque background. It should be noted that the inked bars shown in FIG. 14 represent transparent portions of the film, and that the remainder of the sheet 164 is opaque. Seven of these rows 164b–164h, from the least significant bit row LSB to the most significant bit row MSB, correspond to a seven bit address used to uniquely identify each of the tracks on the disc 50. Another row 164a, contains 128 gate bars which, when positioned directly between the LED-phototransistor pair 184a,194a, cause the LED-phototransistor pairs 184b–184h and 194b–194h to "read" the current seven bit address. The number of gate bars correspond to the number of tracks on the disc 50. An additional row 164i located at the bottom of FIG. 14, is used to indicate that the carriage has moved out of bounds, i.e. that the head is not positioned over any of the tracks. This information is used to cause the motor 130 to move the carriage to the area of valid track data in the event that the carriage moves out of this area of such valid data.

In the preferred embodiment, the bars in the gate row 164a are approximately 0.008 inch wide and the bars in the least significant bit row 164b are approximately 0.03125 inch wide and are equally spaced by this same amount.

The seven rows 164b–164h representing the addresses of the tracks on the disc 50 start with track 0 (the outermost track) which is assigned the binary number 0000000, and end with track 127, (the innermost track) which is assigned the binary number 1111111. If the absence of a bar indicates a "0" and the presence of a bar indicates a "1", then the rightmost position of the encoded film 164 shown in FIG. 14 represents the outermost track (i.e. track 0) and higher numbered tracks are located to the left of this position, with track 64 being in the approximate center of the encoded array and with track 127 being at the leftmost position. It should be understood that the indication of track position illustrated at the top of FIG. 14 is not physically present on the photographic film, but is used merely as an aid in understanding the encoding of the track positions.

The positioning of the encoded film 164 on the carriage 56 relative to the head 54 is adjusted to insure that, when the head is at a desired approximate track location, the encoded film 164 and the LED-phototransistor pairs 184 and 194 produce the appropriate track address.

As seen in FIG. 15, each of the bars in the gate row 164a is centrally located directly above either a bar or a space between bars in the rows 164b–164h, representing the seven bit address. Data is "read" only when a bar in the gate row 164a is aligned with the LED-phototransistor pair 184a and 194a. This insures that an accurate reading of the encoded film 164 takes place and minimizes the possibility of invalid or false data.

Moreover, as seen in FIG. 16, the likelihood of misreading the encoded information is further lessened by use of the mask 197 which is located directly above the phototransistors 194. The transparent slot 197a and the mask 197 prevent extraneous light signals from reaching the phototransistors 194 so that only information present on the photographic film 164 is sensed.

It should be noted that other types of position sensing devices may be used such as potentiometric, radar, sonar, a slip ring and brush arrangement, etc., each of which is capable of providing absolute or relative position information.

Fine Positioning Apparatus

Referring again to FIG. 7, two solenoids 198 and 200 having actuating arms 199 and 201, respectively, are secured to a downwardly extending flange 202 of the guide bracket 182. The actuating arms 199 and 201 have adjustment screws 204 and 206, respectively, which contact push rods 208 and 210, which in turn extend through the flange 202 of the guide bracket 182.

As seen in FIGS. 8 and 9, the push rods 208 and 210 bear against a pair of pawls 212 and 214, respectively, which pass through without contacting a slot 216 located in the side portion of the C-shaped rail 132. The pawls 212 and 214 extend through and are press-fitted so as to be firmly secured within the ends of a pair of spring arms 220 and 222 respectively. The ends of the cylindrical pawls 212 and 214 are diagonally cut at an angle equal to that of the teeth of the rack 152 so as to be capable of engaging the teeth of the rack 152.

In the preferred embodiment, the pawls have a diameter of 3/32 inch, a length of ½ inch, and are diagonally cut at 45°. The spring arms are fabricated of aluminum, and are approximately 4 inches long by ½ inch wide by ⅛ inch thick.

The spring arms 220,222 are secured to the inside of the vertical leg of the C-shaped rail 132 such that the pawls are directly opposite the toothed rack 152.

Referring now to FIG. 11, the spring arm 222 is secured to one end of a bowed adjustment spring 228 by means of a screw 224 which extends through a slot 226 located in the rail 132. The screw 224 extends through a spacer 230 which is slightly longer than the thickness of the vertical web of the C-shaped rail 132 and has an outside diameter slightly less than the width of the slot 226.

The other end of the adjustment spring 228 includes a slot 232, through which extends a screw 234 which secures this end of the adjustment spring 228 to the C-shaped rail 132.

A fine adjustment screw 236 extends through a slot 227 in the center of the adjustment spring 228 and is threadably engaged in a post 238 which extends through a second slot 240 in the C-shaped rail 132 and which is firmly secured to the spring arm 222.

The spring arm 220 is mounted and secured to a bowed adjustment spring 229 in a similar manner, such apparatus being generally a mirror image of the apparatus just described.

The spring arms 220 and 222 may be pre-bent slightly in the vicinity of channels 242 and 244 in the direction opposite to that shown in FIG. 11 so that a spring force is applied to the pawls 212,214 tending to urge them outwardly away from the toothed rack 152. In the preferred embodiment, the channels 242,244 are approximately 0.100 inch deep by 0.187 inch wide.

The attachment of the spring arms 222 and 220 to the respective adjusting springs 228 and 229 through the slots in the vertical leg of the C-shaped rail 132 permits accurate lateral adjustment of the pawls 212 and 214 relative to the upper chassis member 38 and hence the disc 50 via its engagement of the spindle 110. This adjustment is performed as follows.

The screw 234 is loosened to enable coarse lateral adjustment of the pawl position. Since the spacer 230 is slightly longer than the width of the rail 132, the spring 228, and hence the spring arm 222, can be moved laterally to the left or right, due to the size of the slot 232. Once the coarse lateral position has been determined, the screw 234 is tightened to maintain the spring arm 222 in place.

A more accurate lateral adjustment of the pawl 214 is accomplished by tightening or loosening the fine adjustment screw 236. For example, if the screw 234 is securely tightened, and the fine adjusting screw 236 is rotated inwardly into the post 238, the right side of the adjustment spring 228, i.e. the end through which screw 224 passes, will move to the right in FIG. 11 due to flattening of the spring 228.

Conversely, if the fine adjustment screw 236 is rotated outwardly, the adjusting spring will bow outwardly and hence the right side of the adjustment spring 228 will move to the left in FIG. 11.

Since the right side of the spring 228 is firmly secured to the spring arm 222, the pawl 214 moves in concert with this right end of spring 228.

Since the bowed adjustment spring 228 represents a small arc of large radius of curvature, there is a large demagnification between the motion of the adjustment screw 236 and the motion of the right end of the spring 228. In the preferred embodiment, one full turn of the adjustment screw causes approximately 0.005 inch motion of the end of the spring 228, and hence the pawl 214.

As noted above, the two pawl assemblies are identical, one being a mirror image of the other, with the exception that the points of the pawl 212 and 214 are tapered in the same direction. Both coarse and fine adjustment of the position of pawl 212 are accomplished as described above for pawl 214.

The channels 242, 244 and the spring arms 220, 222 allow each pawl to move in an arc of approximately two inches radius on a rigid arm, while at the same time providing the appropriate spring rate for retracting the pawls from the positioning bar 152.

Referring now to FIGS. 12 and 13, an enlarged view of a portion of the toothed rack 152 and the pawls 212, 214 is shown. The pitch of the teeth of the rack 152, designated as dimension A, is made equal to twice the desired distance between adjacent tracks, or the "track pitch", on the disc 50. Further, the pawls 212, 214 are accurately spaced apart by a distance equal to an integral number of tooth pitch lengths plus one-half of a tooth pitch length.

This arrangement provides several benefits. The simple "toggling" of the pawls described below causes the head to rapidly advance by one track as required to play or record longer messages as described previously. Moreover, the accuracy required of the "coarse" positioning system is halved, since a pawl 212 or 214 will engage the proper tooth on the rack 152 independent of the relative position of the rack 152 and the pawl 212 or 214 within the limit of a tooth pitch distance. Furthermore, approximately one-half as many teeth need be cut in the rack 152 for a given number of track locations on the disc 50.

In the preferred embodiment, the pitch of the teeth is made equal to 1/16 inch. Accordingly, the distance between adjacent tracks on the disc 40 is 1/32 inch.

In describing how the pawls and toothed rack cooperate to position the head relative to a desired track on the disc 50, it is useful to think of the pawl 214 as being the pawl for selecting odd-numbered tracks on the disc and pawl 212 as being the pawl for selecting even-numbered tracks on the disc.

In the preferred embodiment, it is desirable to use less than one tooth per track on the disc. If the odd and even pawls 212, 214 are separated by an integral number of tooth pitch lengths plus one-half of a tooth pitch length, the number of teeth in the rack 152 need by only one-half the number of tracks plus the integer number of pitch lengths by which the pawls are separated. For example, if the pawls are separated by 3½ teeth, a toothed rack with a minimum of 64+3 or 67 teeth is required for 128 track positions. In practice, a few more teeth are used to allow for ready installation.

To illustrate the "toggle" action to cause a one-track shift of the head, assume that in FIG. 12 the odd pawl 114 is engaged with the toothed rack 152 such that a particular odd track, such as track 15, is located directly beneath the head 54. If it is desired to access track 16, which is the next adjacent inner track, it is only necessary to simultaneously engage pawl 212 and disengage pawl 214 so as to shift the entire toothed rack 152 to the right in response to movement of the motor output shaft 128. As seen in FIG. 13, the entire rack 152 shifts by 1/32 of an inch, which corresponds to the distance between track 15 and track 16 on the disc 50. Accordingly, consecutive tracks may be accurately accessed by the above-described toggle action.

It should be noted that the fine positioning apparatus may be of a different form, such as a different type of pawl and toothed gear or rack arrangement, a mechanical detent system, an electromagnetic detent system, and so on, any of which is capable of positioning and maintaining the head at the desired track address.

Radial Positioning Operation

Referring to FIGS. 8-11, the radial positioning operation will be explained under the assumption that the head is initially positioned at track 0, i.e. the outermost track on the disc 50, and that it is desired to access the innermost track, i.e. track 127.

When at track 0, the "even" pawl 212 is engaged, as shown in FIG. 13, and the motor 130 is energized under a low voltage condition so as to urge the carriage 56 toward the inner or higher number tracks. However, since the pawl 212 is engaged, the carriage 56 is stationary.

Figure 17:
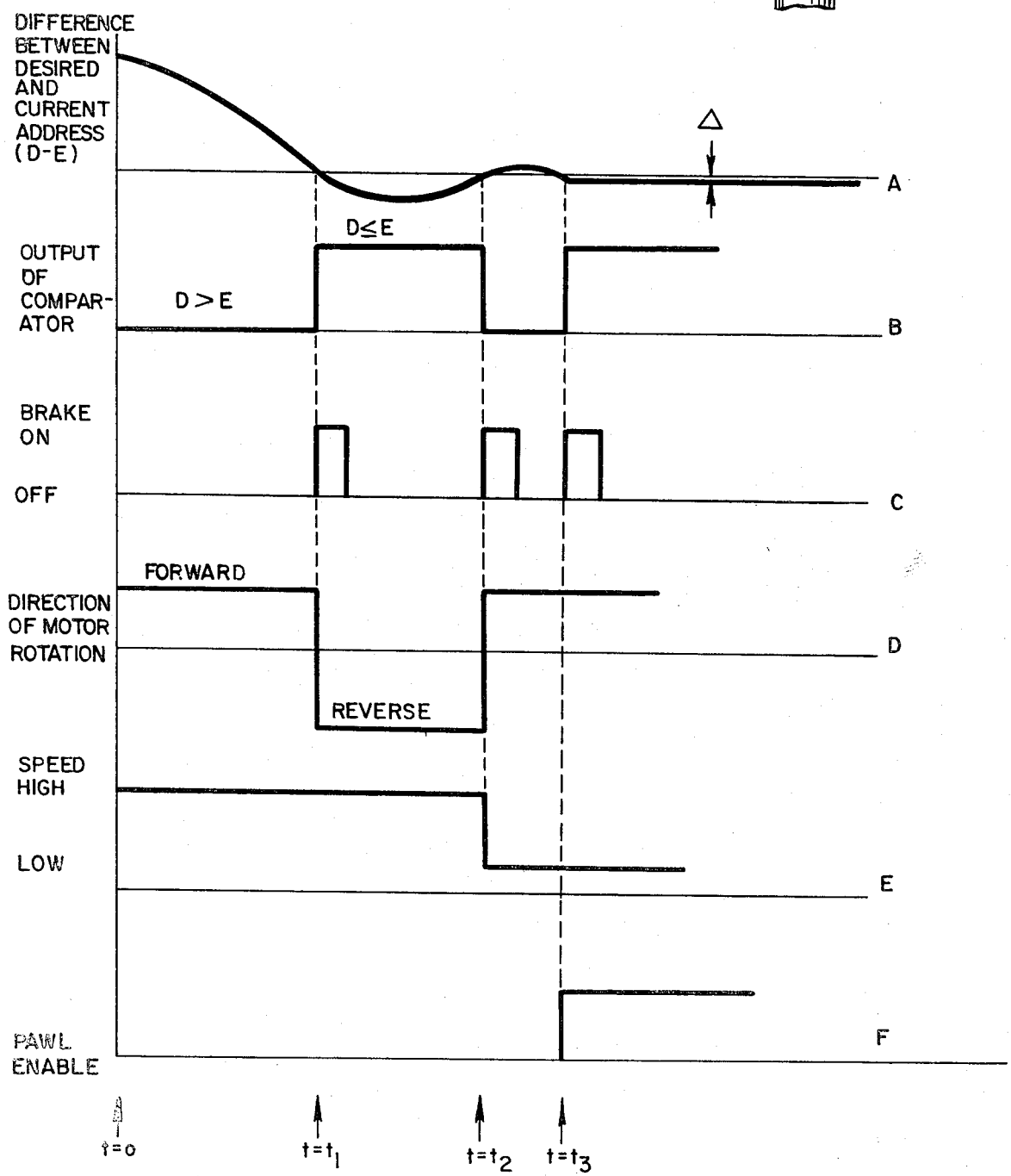
FIG. 17 is a series of timing diagrams illustrating the operation of the radial positioning system, during an access sequence starting from a track located "outside" the desired track, i.e. starting from a lower address and moving to a higher address.

Referring also to FIG. 17, at time t=0, the seven bit address of the desired track, i.e. track 127, is strobed by the control logic. At this time, the following sequence of events takes place:
(a) The current position of the head 54 is sensed by the phototransistor-LED pairs;
(b) The direction in which the head must be moved to access the desired track is determined;
(c) The pawl 212 is disengaged; and
(d) The motor 130 is energized at a high speed to move the carriage 56 in the desired direction, e.g. toward the center of the disc 50.

In the preferred embodiment, the motor 130 moves the carriage at a speed of over 30 inches per second. During movement of the carriage 56, the encoded photographic film 164 moves between the LED-phototransistor pairs. When the LED-phototransistor pair 184a, 194a senses a gate bar, the position of the encoder and carriage is read by the LED-phototransistor pairs 184b–184h and 194b–194h, FIG. 9.

As seen in timing chart "A" of FIG. 17, between time $t=0$ and $t=t_1$, the distance between the "current" track address, denoted E, of the head and the desired track address, denoted D, decreases as the motor 130 drives the carriage 56 in a forward direction at a high speed. Once the desired track has been reached as detected by the LED-phototransistor pairs at time $t=t_1$, the solenoid 192 is energized, thereby causing the brake pin 186 to bear against the upper surface of the brake leaf 168, capturing it between the upper surface of the flange 148 and the brake pin 186. As seen in timing chart "C" of FIG. 17, in the preferred embodiment the solenoid 192 is energized for approximately 10 milliseconds and stops the carriage 56 within this time period. However, by the time the movement of the carriage is arrested, the head 54 has moved past the desired track by as much as $\frac{1}{4}$ inch, owing to the momentum of the carriage developed during its travel from the initial track to the desired track.

During the time that carriage 56 is stopping, the direction of rotation of the motor 130 is reversed as shown in timing chart "D", FIG. 17, and the motor 130 operates at a high speed to quickly move the head back toward the desired track. Also, the fact that one crossing of the desired track has occurred is recorded.

Between time $t_1$ and time $t_2$, the carriage 56 and head 54 move back toward the desired track. When the LED-phototransistor pairs indicate that the track has again been reached, the following actions are initiated:

(a) The solenoid 192 is energized to brake the carriage 56;
(b) The direction of the motor drive is again reversed;
(c) The motor speed is switched from high speed drive to low speed drive as shown in timing chart "E" of FIG. 17; and
(d) The occurrence of the second crossing is recorded.

By the time the carriage is brought to a complete stop the head again has travelled past the desired track, but by a very small amount, typically less than 1/16 inch. The slow speed drive once again moves the carriage and head toward the desired track, but more slowly than before.

When the LED-phototransistor pairs indicate that the desired track has been reached for the third time at $t_3$, the following actions are initiated:

(a) The solenoid 192 is actuated; and
(b) The appropriate pawl is enabled as seen in timing chart "F" of FIG. 17.

Since the carriage 56 and head 54 started from a short distance from the desired track, and since the acceleration of the carriage is relatively low, the brake firing system stops the carriage with almost no overshoot. Tests have shown that the carriage overshoot in the preferred embodiment is less than 0.015 inch at the third crossing and that the stop point is repeated within 0.005 inch independent of the initial starting track location of the carriage and head. The head is therefore positioned within a particular distance of the desired track, such distance being referred to as the "capture range" of the coarse positioning operation.

Figure 18:
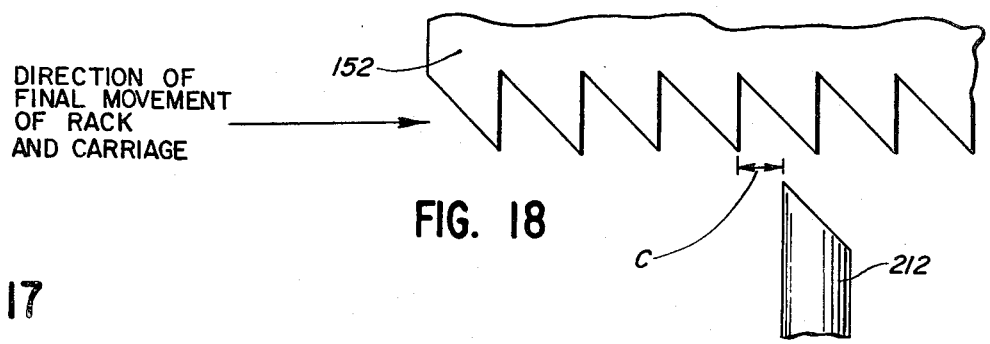
FIG. 18 is a view similar to FIGS. 12 and 13, showing the relative position of components of the fine positioning system just prior to the engagement thereof.

The position of the encoded film 164 is adjusted laterally so that a particular spacing between the pawl and the face of the desired tooth of rack 152, denoted dimension C in FIG. 18, is present when the brake pin engages the brake leaf 168 under the action of solenoid 192 when the final approach to the desired track is made. In the preferred embodiment, the dimension C is approximately 0.040 inch.

Tests have shown that it takes approximately 15 milliseconds for the pawl 212 or 214 to move into the engaged position with respect to the toothed rack 152. Since the brake pin 186 engages for only 10 milliseconds, the brake will release before the pawl 212 or 214 is fully engaged and the carriage will then begin to move slightly to the right before the pawl 212 or 214 has completely engaged with the teeth.

However, since it takes approximately 20 milliseconds for the carriage to accelerate and move the distance C, full engagement of the correct tooth is assured.

It should be noted that the offset of the head from the desired track by the distance C typically causes the current track address E to be advanced by one, in turn resulting in a difference between the current address E and the desired address D when the pawl is engaging with the desired tooth of the rack 152. This difference is schematically represented by the small spacing at the right-hand side of the timing chart "A".

Finally, the low speed drive voltage applied to motor 130 to cause the carriage to move to the desired track for the last time remains on, even after engagement of the pawl. This provides the loading force to hold the toothed rack 152 engaged with the pawl and also provides the driving force to move the carriage when the pawls are toggled to produce the track crossing discussed previously.

Essentially the same procedure is followed when the starting address is higher than the desired address, with the exception that one more "crossing" must be utilized. The reason for this is that the final crossing must occur with the carriage moving in the "forward" or inward direction so that the pawls 212,214 engage the teeth of the rack 152 properly.

Thus, in moving from higher to lower tracks, there must be an even number of crossings to insure that the motor 130 is driving the carriage 56 in the forward direction when the pawl is engaged. It has been found that four crossings are adequate to access the correct track in a minimum period of time.

Hence, it can be seen that coarse radial positioning of the head 54 is accomplished by the LED-phototransistor pairs 184,194 and by the encoded film 164. Fine radial positioning is accomplished by the engagement of the pawl and toothed rack arrangement, which comprise a mechanical latch which is precisely adjustable by means of the adjustment spring 228 and the fine adjustment screw 236.

Since the pawls 212,214 are rigidly mounted on the spring arms 220,222 which are in turn precisely adjustable with respect to the toothed rack 152, the accuracy of positioning of the carriage 56 is primarily determined only by the accuracy of the manufacture of the teeth of the rack 152. Moreover, the simplicity of the fine positioning apparatus in turn leads to a high degree of accuracy even after repeated usage of the unit 30.

Figure 19:
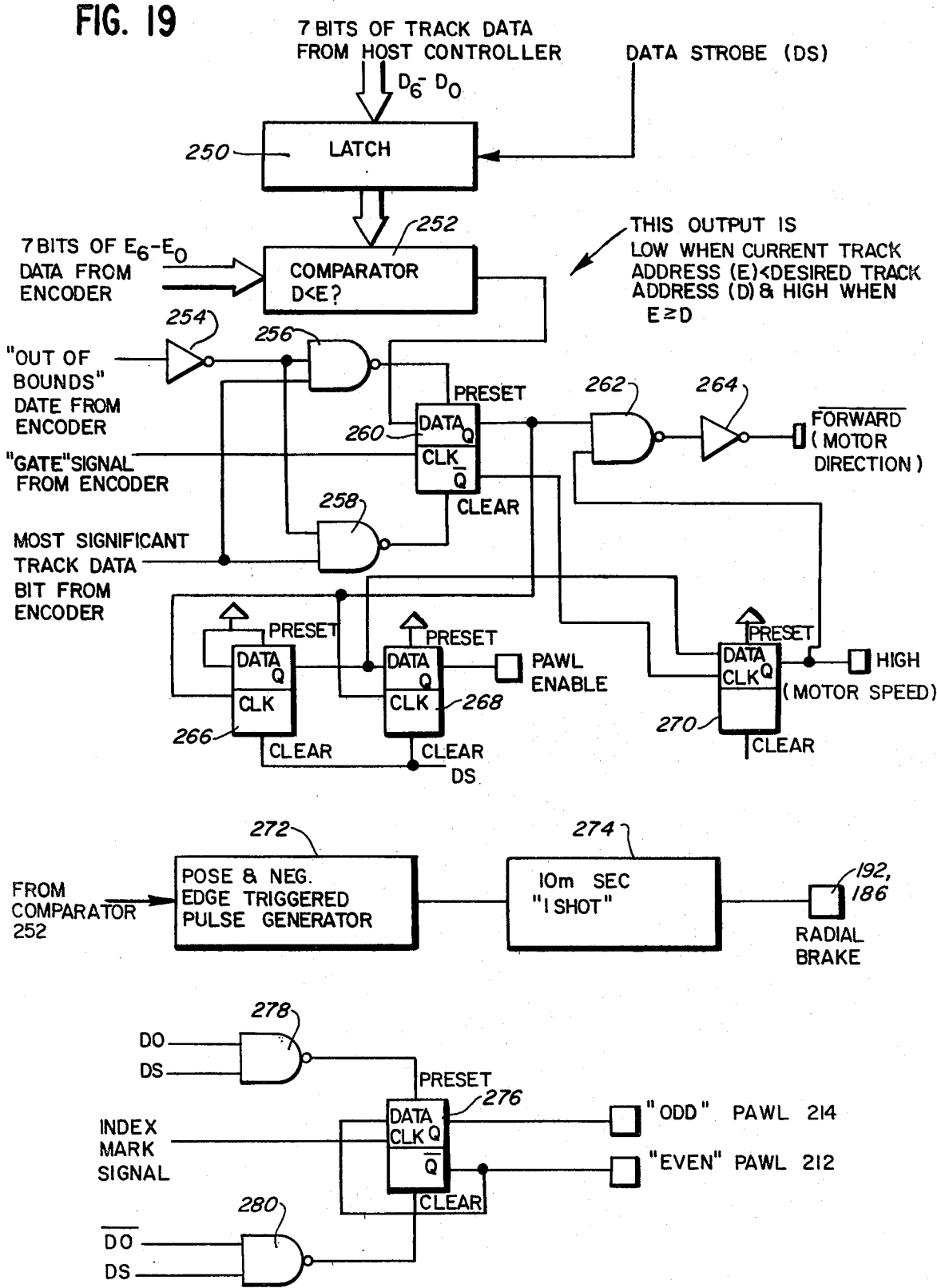
FIG. 19 is a block diagram of the control logic used to implement the radial positioning system.

Referring now to FIG. 19, a portion of the digital control logic 64 shown in FIG. 4, for controlling the radial positioning apparatus is shown.

The seven bits representing the desired track to be accessed are strobed into a latch 250. The seven bits accumulated in the latch 250 are then compared with the seven bits of data from the LED-phototransistors in a comparator circuit 252. The output of the comparator 252 is high when the desired track address D from the host controller is less than or equal to the current track address E from the LED-phototransistor pairs. The output of the comparator 252 is illustrated in timing chart "B" of FIG. 17.

An inverter gate 254 and a pair of NAND gates 256 and 258 decode the "out of bounds" signal from the last row 164i of the photographic film 164 and the most significant bit from the second to last row 164h so as to determine the proper direction of motor movement when the carriage 56 overshoots the range of valid encoder data. In the event the carriage has moved to an out-of-bounds position, a flip flop 260 provides a signal to a NAND gate 262 and an inverter 265 to drive the carriage back into the range of valid encounter data.

When the carriage is not out-of-bounds, the output of the comparator 252 is latched by the flip flop 260, causing the motor to move the carriage in the appropriate direction toward the desired track.

A pair of flip flops 266,268 receive the output from the flip flop 260 and provide a pawl enable signal only after the required number of track crossings have been accumulated. The pawl enable signal must be a high state signal in order for one or the other of the pawls 212,214 to engage.

Each of the flip flops 266,268 are positive edge-triggered flip flops, clocked by transitions between high and low levels of the output of the comparator 252. The flip flops 266,268 are coupled to a data strobe signal DS which clears the contents of the flip flops upon receipt of new track data.

For example, assume that it is desired to move the head 54 from a particular track to a second track located inside the first track. The first crossing of the head past the desired track causes a first transition of the comparator 252, which in turn causes a high state signal appearing at the data input of the flip flop 266 to be coupled to the input of the flip flop 268. The subsequent reverse transition of the comparator 252 occurring at the second crossing is from a high state signal to a low state signal, and hence is ignored by both flip flops 266,268. The next transition of the comparator 252 due to the third crossing of the head past the desired track is from a low state signal to a high state signal, which in turn causes the high state signal present at the data input of the flip flop 268 to appear at the Q output thereof, thereby enabling energization of one of the pawls 212,214.

On the other hand, if initially the desired track is located outside of the current track, the first crossing of the desired track as the carriage is moving in an outward direction produces a high to low transition of the comparator 252, which is ignored by the flip flops 266,268. Consequently, it then takes three more transitions to produce the pawl enable signal, insuring that the motor is urging the carriage in an inward direction as one of the pawls 212,214 is engaged.

A flip flop 270 selects the high or low speed of the motor 130. The flip flop 270 switches the speed of the motor 130 to low speed at the next to last crossing of the desired track. This transition from high to low speed is coupled to the NAND gate 262 and the inverter 264 to cause the motor to be driven in the forward direction, as required. Note that the operation of these circuits hold the motor drive in the low speed, forward mode, regardless of any further changes in the current track address E until new track data is strobed into the logic.

The radial brake which consists of the solenoid 192 and the brake pin 186, is fired each time a transition is made at the output of the comparator 252. The signal from the comparator 252 is coupled to a positive and negative edge-triggered pulse generator 272 which produces a pulse at every transition of the output signal from the comparator 252 between high and low states. The pulse generator 272 in turn drives a one shot multivibrator 274 which produces an output pulse of 10 milliseconds duration to the solenoid 192. The brake pin 186 is then caused to move against the brake leaf 168 for this period of time, in turn halting the carriage 56.

A flip flop 276 is used to select either the odd pawl or the even pawl when the pawl enable signal is provided. A signal $D_0$, which represents the least significant bit of the desired track, is analyzed by a pair of NAND gates 278 and 280, and if this signal is low, the even pawl 212 is moved into position against the toothed rack 152. Conversely, if the least significant bit $D_0$ is a high state signal, then the odd pawl 214 is selected.

Figure 6:
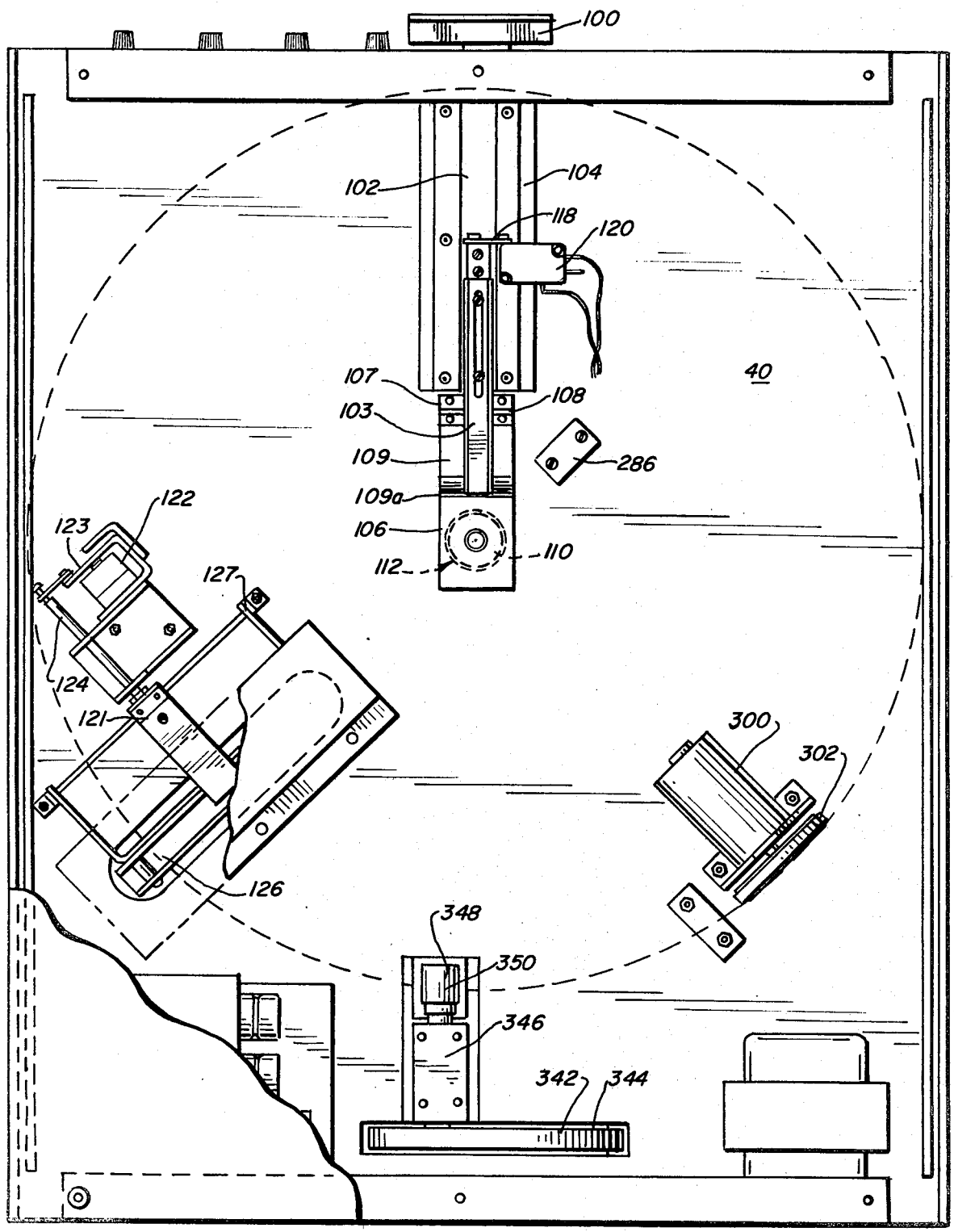
FIG. 6 is a bottom plan view of the random access unit with the lower cover partially broken away.

The flip flop 276 can also be used to cause the head 54 to advance to the next inner track at a particular point in the rotation of the disc 50. As shown in FIGS. 3b and 4, the envelope 52 contains a cutout 284 which allows an LED-phototransistor pair 286, which is a part of the opto-electronic sensors 66 shown in FIG. 4, to sense the index mark 81 as it passes therebetween, as shown in FIGS. 5 and 6. Each time this index mark 81 passes between the LED-phototransistor pair 286, a signal is coupled to the clock input of the flip flop 276, causing the output of this flip flop to toggle thus toggling the pawls 214 and 212. As previously noted, the sequential toggling of the odd and even pawls causes the head to advance to the next inner track each time the index mark 81 is sensed while playing or recording. Consequently, during either recording or playing back a message, if the index mark is encountered, the next track located to the inside of the current track will be accessed and the message will continue on the next inner track, with an interruption barely noticeable, if at all, by the user.

Angular Positioning System

Referring to FIGS. 5 and 6, the angular accessing system includes a fast access motor 300 which drives a flywheel 302. The flywheel 302 extends into an aperture 304 located in the lower chassis member.

Referring to FIGS. 5 and 20, a solenoid 306 having an actuating arm 308 is energizable to move a pinch roller 310 downwardly such that the disc 50 is captured between the flywheel 302 and the pinch roller 310. As noted in FIG. 3b, a suitable cutout 312 is provided in the envelope 52 to allow the flywheel and pinch roller to contact the disc 50.

Referring to FIG. 20, a solenoid 314 includes an actuating arm 316 which has an adjusting screw 318 located at the end thereof and which bears against a brake pin 320. The brake pin 320 includes a circumferential channel 322 which receives a yoke 324 at the end of a spring arm 326. The spring arm 326 is anchored by means of screws 328 and has a central portion which is secured to a push rod 309 which is coupled between the pinch roller 310 and the actuating arm 308 of solenoid 306.

The spring arm 326 urges the brake pin 320 and the pinch roller 310 upwardly away from the disc 50 when the solenoids 314 and 306 are de-energized. The solenoid 314 includes a travel limit screw 319 which allows the actuating arm to move only a short distance upwardly away from the stator of the solenoid.

Located directly beneath the brake pin 320 on the lower chassis member 40 is a lower brake pad 328 which contacts the disc 50 when the brake pin 320 is moved downwardly into contact with the disc 50.

A cutout 330, FIG. 3b, is provided in the envelope 52 for allowing the brake pin 320 and the brake pad 328 to contact the disc 50 when the solenoid 314 is energized.

Referring to FIGS. 5 and 6, a read/write drive motor 340 is mounted on the upper chassis member 38. The drive motor 340 in turn drives a belt 342 and a flywheel 344. The axle of the flywheel passes through a bearing 346 to a capstan 348. The capstan 348 is a hub attached to the opposite end of the flywheel axle and has an elastomer collar 350 disposed about its periphery.

An actuating arm 352 of a solenoid 354, FIG. 5, bears against a spring blade 356 which in turn mounts a stainless steel ball bearing pinch roller 358 which extends into a recess 360 located in the upper chassis member 58 when the solenoid 354 is actuated.

The read/write drive motor 340 is preferably a servoed DC motor capable of accurately driving the disc 50 at a constant rotational speed.

Rotation of the disc 50 is accomplished by energizing the solenoid 354, which forces the pinch roller 58 into contact with the disc 50 through a suitable cutout 362, FIG. 3b, located on an edge of the envelope 52. The pinch roller 358 causes the disc 50 to contact the elastomer collar 350 of the capstan 348 which frictionally engages the disc 50.

In order to keep wow and flutter at a minimum, an elastomer collar 350 is used which is as close to being perfectly round as possible. In order to obtain accurate roundness, the elastomer collar 350 is first placed on the capstan and is ground in situ to the desired dimension. Since the collar is already mounted on a capstan with which it will be used, accurate dimensioning of the collar 350 is assured.

The angular access system allows rapid accessing of any one of the 32 sectors located on the disc 50.

When the unit 30 is in its inoperative state, the angular access system components such as the pinch roller 310 and the brake pin 320 are in the positions shown in FIG. 20, i.e. the brake pin 320 and the pinch roller 310 are retracted away from the disc 50.

When a command to play or record a message located at a particular sector is received by the unit 30, the motor 300 is turned on and the fast access pinch roller 310 is moved downwardly under the action of the solenoid 306 into engagement with the disc 50, as shown in FIG. 21, thereby causing the flywheel 302 to rotate the disc at a fast rate. Also, when the solenoid 306 is actuated to move the spring arm 326 downwardly, the brake pin 320 is permitted to move downwardly into contact with the disc 50. However, since the solenoid 314 is de-energized at this time, the only force acting downwardly on the disc is the weight of the brake pin 320 plus the weight of the actuating arm assembly 316.

The adjustment screw 318 is set so that the actuating arm is just short of contact with the stator of the solenoid 316. This minimizes delay and maximizes braking force when the brake solenoid 314 is energized.

A system for implementing the fast access and read/write modes of the angular positioning system and the operation thereof is described in my prior U.S. Pat. No. 4,124,872 entitled "Record/Playback Apparatus", the disclosure of which is hereby incorporated by reference. The following is a brief description of the operation of the angular access system, it being understood that a more detailed description may be found in said patent.

Referring also to FIGS. 22–26, operation of the angular accessing system will be described under the assumption that it is desired to access a message which begins at the 10th sector and ends at the beginning of the 19th sector of a particular track.

Figure 23:
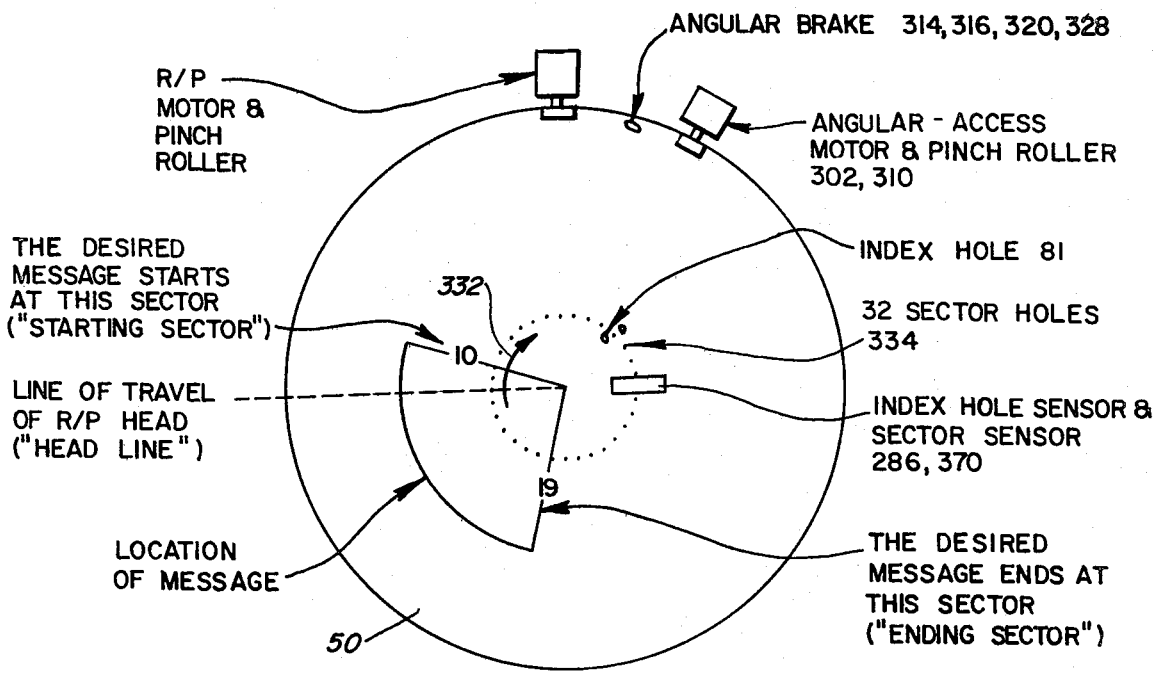
FIGS. 23-26 are schematic views of the angular accessing system of the invention.

When the command to access the 10th sector is received, the solenoid 306 is actuated, causing the pinch roller 310 to engage the disc 50, in turn causing the disc to rotate in the direction of the arrow 332 as shown in FIG. 23.

As the disc 50 is rotated, a plurality of sector holes 334 which indicate the positions of the sectors on the disc 50 pass between an LED-phototransistor pair 370, which is a part of the opto-electronic sensors 66 shown in FIG. 4. The sector holes 334 are sensed by the LED-phototransistor pair 370 and are counted to determine the position of the sectors of the disc 50 relative to the radial line of travel of the read/write head 54.

Figure 24:
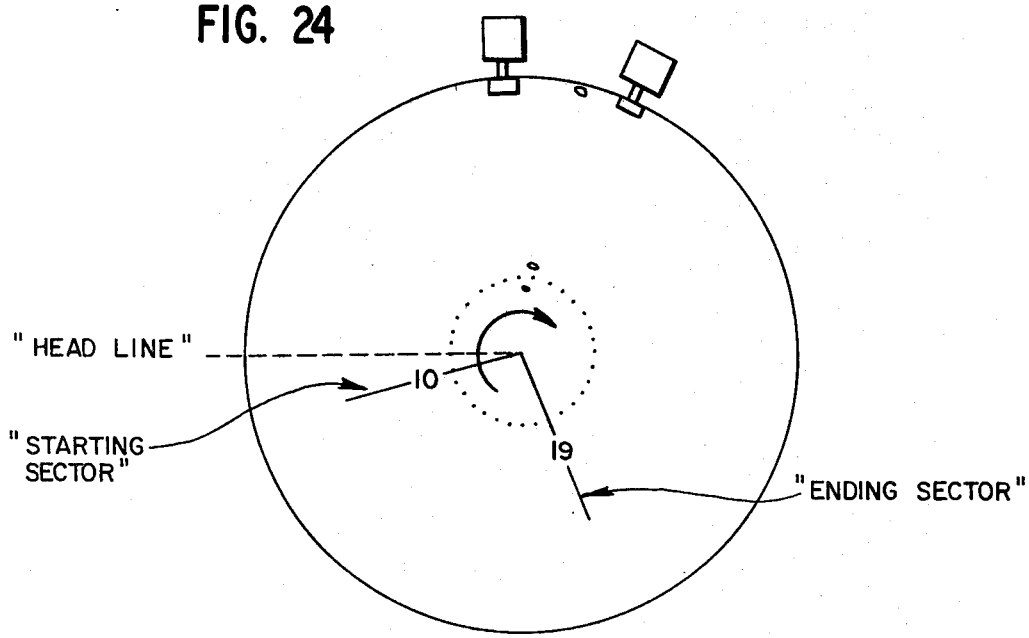
Figure 25:
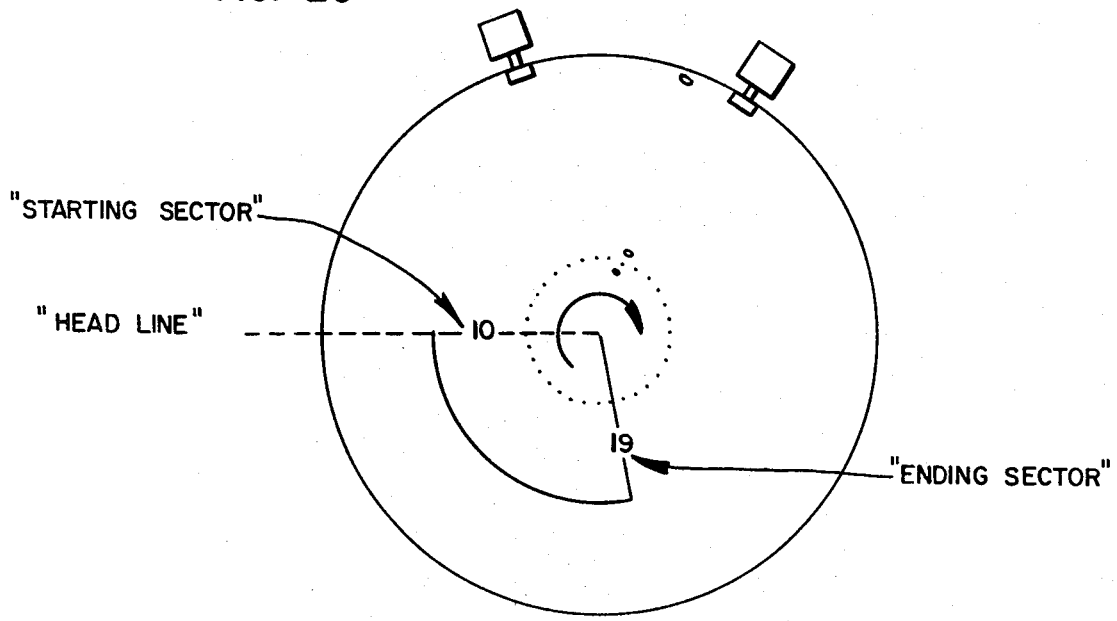
Figure 26:
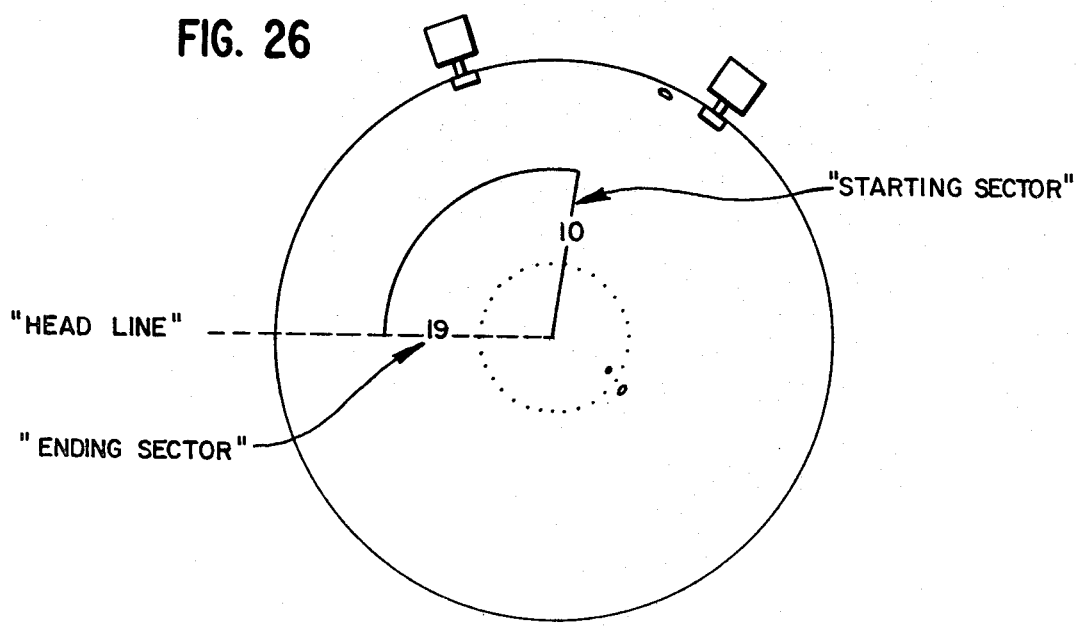

When the sector sensor consisting of the LED-phototransistor pair 370 determines that the sector preceding the desired sector is located at the "head line" as shown in FIG. 24, the angular brake consisting of the solenoid 314, the actuating arm 316, the brake pin 320 and the lower brake pad 328 is actuated for approximately 10 milliseconds. At the time the brake is fired, the disc may be travelling at approximately 10 milliseconds per sector. Therefore, in order to stop the disc well in advance of the desired sector, the brake must be capable of stopping the disc in approximately 5 milliseconds. As previously noted, the brake pin travel is minimized and the applied force to the disc is maximized since the brake pin 320 rests on the disc 50 as the disc is rotated. Moreover, the solenoid 314 is fired by a high voltage, which may be on the order of 24 volts for a six volt solenoid.

As noted in FIG. 22, once the brake is fired, the fast access pinch roller 310 is retracted from the surface of the disc 50 and hence further movement of the disc is prevented. The read/write drive motor 340 is then engaged by energizing solenoid 354, which in turn causes the pinch roller 358 to contact the disc 50.

The read/write motor advances the disc at the read/write angular velocity until the staring sector, i.e. sector 10, reaches the "head line". At this point, the record or play electronics are activated and the message begins. The read/write motor system continues to drive the disc until the "ending sector" i.e. sector 19, reaches the "head line". At this point, the read/write pinch roller disengages due to de-energization of the solenoid 354, and the record or play electronics are de-activated. The disc 50 consequently stops rotating until another message is commanded.

The system disclosed in U.S. Pat. No. 4,124,872 is similar in some respects to the present angular positioning system, with some important differences.

In the fast access system of U.S. Pat. No. 4,124,872 the brake for stopping rotation of the disc 50 after completion of fast accessing is located downstream of the fast access motor. That is, the fast access motor drives the disc 50 into the brake, which can cause buckling of the disc under some conditions.

On the other hand, the present brake system is located upstream of the angular access motor, and hence buckling of the disc is avoided.

A further important difference is the "loading" of the brake system in the present system, which allows rapid deceleration and stopping of the disc at the sector before the desired sector. As previously noted, when the fast access motor 300 is engaged, the spring arm 326 allows the brake pin 320 to lightly contact the disc 50, thereby minimizing the distance required by the brake pin to move in order to stop the disc 50. Also, as previously noted, the actuating arm 316 of the solenoid 314 is adjusted so as to reside a very small distance from the stator of the solenoid 314, thereby further reducing the response time of the brake and increasing the stopping force available to act against the disc 50. On the other hand, when solenoids 306 and 314 are de-energized, arm 326 lifts brake pin 320 clear of the disc 50. Thus, during the record or play period, the brake pin 320 produces no drag on disc 50. Such a system is not shown in U.S. Pat. No. 4,124,872.

At the same time the read/write solenoid 354 is actuated, a backing plate system is energized to insure proper contact of the head 54 with the disc 50.

Referring to FIGS. 6 and 10, a backing plate carriage 121 is pivotally mounted to the lower chassis member 40. The solenoid 122 includes an actuating arm 123 which contacts a push rod 124 which in turn bears against a flange 125 of the carriage 121. A head backing plate 126 is loosely mounted by means of a threaded bolt and bushing 127 in an oversized hole of an upstanding arm 129 of the carriage 121. A spring clip 131 is anchored within a portion of the carriage 121 and bears against the bolt and bushing 127, urging the head backing plate upwardly such that the bolt and bushing 127 is displaced upwardly in the hole in the end of the upstanding arm 129.

When the solenoid 122 is deactuated, the carriage 121 is in the position shown by the phantom lines of FIG. 10, i.e. the backing plate is spaced away from the disc 50.

When the solenoid 122 is energized, the actuating arm 123 displaces the push rod 124, and hence pivots the carriage 121 upwardly such that the backing plate 126 contacts the disc 50, causing the disc to firmly contact the head 54. The spring clip 131 causes the threaded bolt and bushing 127 of the backing plate 126 to move away from the edges of the hole in the upstanding arm 129 so that the backing plate 126 is decoupled from the remainder of the carriage 121.

By decoupling the backing plate 126 from the carriage 121, the head backing pressure, i.e. the pressure of the plate 126 against the disc 50 and the head 54, can be adjusted independent of the force applied by the solenoid.

Moreover, since the bolt and bushing 127 are free to move under the influence of the spring clip 131 within the hole in the arm 129, the effective mass associated with the head backing system is minimized, i.e. only the mass of the head backing plate need be considered in determining the effects of perturbations present on the surface of the disc 50. Since only this relatively low mass is involved, the head backing system is capable of following small irregularities in the surface of the disc 50, and hence maximum compliance is achieved resulting in minimal dropout and relatively constant backing pressures even during high frequency movements due to irregularities present on the surface of the disc 50.

Furthermore, the stiffness constant of the spring clip 131 and the size of the hole in the end of the upstanding arm 129 are selected so that the solenoid need only overcome the force of the spring for a short distance when the backing plate 126 is moved into position against the disc 50. This in turn allows fast engagement of the backing plate 126 against the disc 50 when it is desired to record or play back information at a particular storage position.

SUMMARY

The present system provides rapid accessing of any of the 4096 storage positions on the 15 inch disc. For example, access times of less than 400 milliseconds to complete a four inch access are easily achieved. One can reduce the access time significantly by reducing the mass of the carriage, using a low inertia drive motor, using a faster and stronger brake system, and utilizing larger drive forces. Also, it is possible to use a "look ahead" scheme whereby braking action in the radial positioning system is applied well in advance of the reaching of the desired track and hence eliminating overshoot entirely.

The radial positioning system described above may be used in any application where it is desired to quickly and accurately position a first structure relative to a desired point on a second structure. For example, if a storage medium contains a two dimensional array of storage positions arranged in a cartesian coordinate system, the radial positioning apparatus and process may be utilized in both dimensions to quickly and accurately access any one of the storage positions.

Moreover, it should be noted that the positioning system is not limited for use in digital or analog information storage systems, but may be used in any type of system where it is desired to accurately locate one structure relative to another.

The foregoing detailed description is given for clearness of understanding only, and no unnecessary limitations should be understood therefrom, as modifications within the scope of the invention will be obvious to those skilled in the art.

I claim:

1. An apparatus for storing or retrieving information in or from a storage medium having a plurality of storage positions, said apparatus including a read/write head movable along the plurality of storage positions for sensing the information or for placing the information in the storage medium and accessing means for causing the head to access a desired storage position identified by a desired position value, said accessing means comprising:

means for developing a current position value representing the current position of the head;
   means for comparing the current position value with the desired position value;
   means responsive to the comparing means for causing relative movement of the head and storage medium to decrease the distance between the head and the desired storage position;
   first positioning apparatus responsive to the comparing means for causing the head to be positioned within a particular distance of the desired storage position;
   a latch having an engaged position wherein the head is accurately positioned at the desired storage position; and
   means responsive to the comparing means for causing the latch to be in the engaged position when the head is positioned by the first positioning apparatus.

2. The apparatus of claim 1, wherein the developing means includes means for providing an encoded indication of the current position of the head.

3. The apparatus of claim 2, wherein the developing means further includes means for reading the encoded indication to develop the current position signal.

4. The apparatus of claim 3, wherein the means for providing the encoded information is a sheet of film having a series of optically encoded numbers uniquely identifying each of the plurality of storage positions.

5. The apparatus of claim 4, wherein the means for reading is a set of light emitting diode-phototransistor pairs which sense the optically encoded numbers.

6. The apparatus of claim 1, wherein the accessing means further includes a carriage movable along at least one guide rail, the head being disposed on the carriage.

7. An apparatus for storing or retrieving information in or from a storage medium having a plurality of storage positions, said apparatus including a read/write head movable along the plurality of storage positions for sensing the information or for placing the information in the storage medium and accessing means for causing the head to access a desired storage position identified by a desired position value, said accessing means comprising:
  a carriage movable along at least one guide rail, the head being disposed from the carriage;
  means for developing a current position value representing the current position of the head;
  means for comparing the current position value with the desired position value;
  means responsive to the comparing means for causing relative movement of the head and storage medium to decrease the distance between the head and the desired storage position;
  first positioning apparatus responsive to the comparing means for causing the head to be positioned within a particular distance of the desired storage position;
  second positioning apparatus having an engaged position wherein the head is accurately positioned at the desired storage position, the second positioning apparatus including a toothed rack disposed on the carriage and at least one pawl for engaging the toothed rack to position the carriage and the head; and
  means responsive to the comparing means for causing the second positioning apparatus to be in the engaged position when the head is positioned by the first position apparatus.

8. The apparatus of claim 7, wherein the second positioning apparatus further includes a solenoid having an actuating arm coupled to the pawl for selectively controlling the engagement of the pawl with the toothed rack.

9. The apparatus of claim 8, wherein the second positioning apparatus further includes a spring arm having one end mounted on the guide rail and a second end to which the pawl is secured for maintaining the pawl at a desired lateral position with respect to the plurality of storage positions.

10. The apparatus of claim 9, wherein the second positioning apparatus further includes coarse lateral adjustment apparatus, including:
  a threaded hole disposed in a side of said guide rail;
  a connecting member having one end secured to the spring arm and a second end having a slot; and
  a threaded bolt extending into the threaded hole through the slot for mounting the second end of the connecting member on the guide rail, said slot being slidable about the threaded bolt such that the pawl is positionable at any point relative to the plurality of storage positions within a particular lateral range of positions.

11. The apparatus of claim 9, wherein the second positioning apparatus further includes a fine lateral adjustment apparatus, including:
  a bowed spring having a variable radius of curvature, a first end secured to the guide rail, a second end having a first hole and a center portion having a second hole;
  a slot in the guide rail;
  a threaded bolt extending through the first hole and the slot in the guide rail and engaging a threaded hole in the spring arm; and
  a fine adjustment screw extending through the second hole into a threaded post secured to the spring arm for controlling the radius of curvature of the bowed spring to move the spring arm and pawl relative to the plurality of storage positions within a particular lateral range of positions.

12. The apparatus of claim 6, wherein the first positioning apparatus includes means for terminating movement of the carriage including a brake leaf mounted on the carriage and means for engaging the brake leaf.

13. The apparatus of claim 12, wherein the engaging means includes a brake pin and means for selectively moving the brake pin into engagement with the brake leaf.

14. An apparatus for storing or retrieving information in or from a storage medium having a plurality of storage positions, said apparatus including a read/write head movable along the plurality of storage positions for sensing the information or for placing the information in the storage medium and accessing means for causing the head to access a desired storage position identified by a desired position value, said accessing means comprising:
  a carriage movable along at least one guide rail, the head being disposed on the carriage;
  means for developing a current position value representing the current position of the head;
  means for comparing the current position value with the desired position value;
  means responsive to the comparing means for causing relative movement of the head and storage medium to decrease the distance between the head and the desired storage position;
  first positioning apparatus responsive to the comparing means for causing the head to be positioned within a particular distance of the desired storage position;
  second positioning apparatus having an engaged position wherein the head is accurately positioned at the desired storage position, the second positioning apparatus further including a toothed rack disposed on the carriage and first and second pawls for engaging the toothed rack to position the carriage and the head; and
  means responsive to the comparing means for causing the second positioning apparatus to be in the engaged position when the head is positioned by the first positioning apparatus.

15. The apparatus of claim 14, wherein the second positioning apparatus further includes first and second solenoids having actuating arms coupled to the first and second pawls, respectively, for selectively engaging either of the first or the second pawl with the toothed rack.

16. The apparatus of claim 15, wherein the second positioning apparatus further includes means for selecting engagement of either the first or the second pawl with the toothed rack depending upon the desired position value.

17. The apparatus of claim 14, wherein each storage position is separated by a first distance from adjacent storage positions, and wherein the toothed rack includes a plurality of teeth separated by a second distance equal to twice the first distance, and wherein the pawls are separated by an integral member of second distances plus the first distance.

18. An apparatus for positioning a first structure at a desired point on a second structure, said first structure being disposed on a movable carriage, comprising:
   means for positioning the first structure within a particular distance of the desired point;
   a toothed rack disposed on the carriage;
   at least one pawl;
   means for adjusting the position of the pawl relative to the desired point including means for coarsely adjusting and means for finely adjusting the position of the pawl; and
   means for causing the pawl to engage the toothed rack when the first structure is within the particular distance of the desired point to position the first structure at the desired point.

19. An apparatus for positioning a first structure at a desired point on a second structure, said first structure being disposed on a movable carriage, comprising:
   means for positioning the first structure within a particular distance of the desired point;
   a toothed rack disposed on the carriage;
   at least one pawl;
   means for adjusting the position of the pawl relative to the desired point including means for coarsely adjusting and means for finely adjusting the position of the pawl;
   means for causing the pawl to engage the toothed rack when the first structure is within the particular distance of the desired point to position the first structure at the desired point;
   a guide rail along which the carriage is movable; and
   a spring arm having one end mounted on the guide rail and a second end to which the pawl is secured, said spring arm being movable by the means for coarsely adjusting and by the means for finely adjusting to adjust the position of the pawl.

20. The positioning apparatus of claim 19, wherein the means for coarsely adjusting includes:
   a threaded hole disposed in the guide rail;
   a connecting member having one end secured to the spring arm and a second end having a slot; and
   a threaded bolt extending into the threaded hole through the slot for mounting the second end of the connecting member on the guide rail, said slot being slidable about the threaded bolt to position the pawl at a particular point within a range of positions relative to the desired point.

21. The positioning apparatus of claim 19, where the means for finely adjusting includes:
   a bowed spring having a variable radius of curvature, a first end secured to the guide rail, a second end having a first hole and a center portion having a second hole;
   a slot in the guide rail;
   a threaded bolt extending through the first hole and the slot in the guide rail and engaging a threaded hole in a spring arm; and
   a fine adjustment screw extending through the second hole into a threaded post secured to the spring arm for controlling the radius of curvature of the bowed spring to move the spring arm and pawl relative to the desired point within a particular range of positions.

22. An apparatus for positioning a read/write head at a desired one of a plurality of storage positions, said storage position being identified by a desired address, comprising:
   a movable carriage upon which the head is disposed;
   a motor for moving the carriage to position the head at any one of the plurality of storage positions;
   a sensor for developing a current address representing the current position of the head;
   a comparator for comparing the desired address with the current address;
   coarse positioning apparatus coupled to the motor and responsive to the comparator for positioning the head within a particular distance of the desired storage position; and
   a mechanical latch for arresting the movement of the motor and carriage to position the head at the desired storage position.

23. The apparatus of claim 22, wherein the coarse positioning apparatus includes a brake actuable in response to the comparator for braking the carriage when the current address is equal to the desired address.

24. The apparatus of claim 23, wherein a brake leaf is secured to the carriage and wherein the brake includes a brake pin for engaging the brake leaf.

25. The apparatus of claim 23, wherein the brake is actuated by a solenoid, and a trigger is coupled between the comparator and the solenoid for actuating the solenoid and brake each time the head is positioned at the desired storage position.

26. The apparatus of claim 22, wherein the motor is energizable to move the carriage in a first direction or in a second direction opposite to the first direction, and wherein the coarse positioning apparatus includes means for reversing the motor and the direction of movement of the carriage when the current address is equal to the desired address.

27. The apparatus of claim 26, wherein the coarse positioning means further includes means for determining the number of times the motor is reversed, and means coupled to the determining means for energizing the motor to drive the carriage and head toward the desired address at a first speed or a second speed slower than the first speed in response to the determining means.

28. The apparatus of claim 26, further including means coupled to the reversing means and to the mechanical latch for enabling engagement of the mechanical latch only when the carriage is moving in the first direction.

29. A method of moving a read/write head between a first storage position and a second storage position adjacent the first storage position on a storage medium, said read/write head being mounted on a carriage movable in response to a motor along a path containing the storage positions, said carriage having mounted thereon a toothed rack having a series of equally spaced teeth separated from one another by a pitch length, said teeth being engageable by at least two pawls separated from each other by a distance equal to an integral number of pitch lengths plus one-half of a pitch length, one of said pawls being engaged with the toothed rack to position the head at the first storage position, said method comprising the steps of:

(a) energizing the motor to urge the head toward the second storage position;

(b) disengaging the one pawl to allow the head to move toward the second storage position at a particular speed; and (c) engaging the other pawl after the one pawl is disengaged at a time related to the speed of the head such that the head is positioned at the second storage position.

30. An apparatus for positioning a read/write head at a desired one of a plurality of storage positions, said storage position being identified by a desired address, comprising:

a movable carriage upon which the head is disposed;

a motor for moving the carriage to position the head at any one of the plurality of storage positions, wherein the motor is energizable to move the carriage in a first direction or in a second direction opposite to the first direction;

a sensor for developing a current address representing the current position of the head;

a comparator for comparing the desired address with the current address;

coarse positioning apparatus coupled to the motor and responsive to the comparator for positioning the head within a particular distance of the desired storage position and including means for reversing the motor and the direction of movement of the carriage when the current address is equal to the desired address;

a mechanical latch for arresting the movement of the motor and carriage to position the head at the desired storage position and including a toothed rack disposed on the carriage and at least two pawls, one of which is actuable for engaging the toothed rack to arrest the movement of the carriage;

menas coupled to the reversing means and to the mechanical latch for enabling engagement of a mechanical latch only when the carriage is moving in the first direction; and means coupled to the pawl for selecting actuation for one of the pawls responsive to the engagement enabling means.

31. The apparatus of claim 30, wherein the actuation selecting means includes means for analyzing the desired address to select the pawl to be actuated.

32. A method of positioning a first structure at a desired one of a plurality of positions on a second structure in part by means of a latch, said desired position being identified by a desired position value, comprising the steps of:

a. sensing the current position of the first structure and developing a current position value representing the sensed current position;

b. comparing the current position value with the desired position value;

c. causing relative movement between the first structure and the second structure in response to said comparing so that the distance between the current position of the first structure and the desired position decreases;

d. terminating the relative movement of the first and second structures when the current position value is approximately equal to the desired position value;

e. repeating steps (a) and (d) until the first structure comes to rest within a predetermined distance of the desired position; and f. engaging the latch to cause further relative movement between the first and second structures to position the first structure at the desired position.

* * * * *